| (12) | United States Patent | (10) Patent No.: | US 11,771,126 B2 |
|---|---|---|---|
| | Li et al. | (45) Date of Patent: | Oct. 3, 2023 |

(54) MULTI-STATION ADAPTIVE WALNUT SHELL PRE-BREAKING SYSTEM

(71) Applicants: QINGDAO UNIVERSITY OF TECHNOLOGY, Shandong (CN); XINJIANG JIANG NING LIGHT INDUSTRIAL MACHINERY ENGINEERING TECHNOLOGY CO., LTD., Xinjiang (CN)

(72) Inventors: Changhe Li, Qingdao (CN); Mingcun Shi, Qingdao (CN); Yiping Feng, Qingdao (CN); Yitian Feng, Qingdao (CN); Zhenming Jia, Qingdao (CN); Leilei Zhao, Qingdao (CN); Rong Wang, Qingdao (CN); Yucheng Wang, Qingdao (CN); Yanbin Zhang, Qingdao (CN); Ji Che, Qingdao (CN); Runze Li, Qingdao (CN); Cai Wang, Qingdao (CN); Min Yang, Qingdao (CN); Yali Hou, Qingdao (CN)

(73) Assignees: QINGDAO UNIVERSITY OF TECHNOLOGY, Qingdao (CN); XINJIANG JIANG NING LIGHT INDUSTRIAL MACHINERY ENGINEERING TECHNOLOGY CO., LTD., Urumqi (CN)

( * ) Notice: Subject to any disclaimer, the term of this patent is extended or adjusted under 35 U.S.C. 154(b) by 695 days.

(21) Appl. No.: 16/959,607

(22) PCT Filed: Oct. 29, 2019

(86) PCT No.: PCT/CN2019/114093
§ 371 (c)(1),
(2) Date: Jul. 1, 2020

(87) PCT Pub. No.: WO2021/027077
PCT Pub. Date: Feb. 18, 2021

(65) Prior Publication Data
US 2021/0401025 A1 Dec. 30, 2021

(30) Foreign Application Priority Data
Aug. 9, 2019 (CN) .......................... 201910734799.X

(51) Int. Cl.
*A23N 5/00* (2006.01)
*B07B 1/15* (2006.01)

(52) U.S. Cl.
CPC . *A23N 5/00* (2013.01); *B07B 1/15* (2013.01)

(58) Field of Classification Search
CPC .......... A23N 5/00; A23N 5/004; A23N 5/006; A23N 5/008; B07B 1/15; B07B 13/04
See application file for complete search history.

(56) References Cited

U.S. PATENT DOCUMENTS

| 4,699,049 A * | 10/1987 | Mizer | ....................... A23N 5/00 19/35 |
|---|---|---|---|
| 2009/0301320 A1 * | 12/2009 | Borrell | ................... A23N 5/008 99/569 |
| 2014/0294446 A1 * | 10/2014 | Sako | .................. G03G 15/0891 399/255 |

FOREIGN PATENT DOCUMENTS

| CN | 1765229 A | 5/2006 |
|---|---|---|
| CN | 102771877 A | 11/2012 |

(Continued)

OTHER PUBLICATIONS

Machine translation of CN-106473167-A (Year: 2017).*
(Continued)

*Primary Examiner* — Erin McGrath
(74) *Attorney, Agent, or Firm* — Oliff PLC

(57) ABSTRACT

The present invention discloses a multi-station adaptive walnut shell pre-breaking system, comprising a feeding
(Continued)

device and a shell pre-breaking device. The feeding device comprises a feeding box, a single-helix twister and a double-helix twister are disposed in the feeding box, the single-helix twister and the double-helix twister rotate in opposite directions, and an adjustable spring partition is disposed below the single-helix twister and the double-helix twister; the shell pre-breaking device comprises a shell pre-breaking box, a plurality of squeezing stations are provided in the shell pre-breaking box, each of the squeezing stations is provided with a shell pre-breaking assembly, the shell pre-breaking assembly comprises a falling U-shaped plate and a squeezing U-shaped plate, a first end of the falling U-shaped plate is hinged to the shell pre-breaking box, a second end of the falling U-shaped plate is pushed to move by a falling cam, the end of the squeezing U-shaped plate opposite to the first end of the falling U-shaped plate is pushed to move by a squeezing cam, the end of the squeezing U-shaped plate opposite to the second end of the falling U-shaped plate is hinged to the shell pre-breaking box, the squeezing cam is in an outer dwell state when the falling cam moves, and the falling cam is in an outer dwell state when the squeezing cam moves.

9 Claims, 15 Drawing Sheets

(56) References Cited

FOREIGN PATENT DOCUMENTS

| CN | 202958721 U | 6/2013 | | |
|---|---|---|---|---|
| CN | 103610215 A | 3/2014 | | |
| CN | 204470122 U | 7/2015 | | |
| CN | 204813555 U | 12/2015 | | |
| CN | 105410955 A | 3/2016 | | |
| CN | 105852151 A | 8/2016 | | |
| CN | 205947069 U | 2/2017 | | |
| CN | 106473167 A | * | 3/2017 | ............... A23N 5/00 |
| CN | 106666763 A | 5/2017 | | |
| CN | 206260774 U | 6/2017 | | |
| CN | 107127136 A | 9/2017 | | |
| CN | 206518109 U | 9/2017 | | |
| EP | 0555937 A1 | * | 2/1993 | ............. A23N 17/02 |
| JP | H10-127246 A | 5/1998 | | |
| KR | 20150085933 A | 7/2015 | | |

OTHER PUBLICATIONS

Apr. 24, 2020 International Search Report issued in International Patent Application No. PCT/CN2019/114093.

Apr. 24, 2020 Written Opinion issued in International Patent Application No. PCT/CN2019/114093.

* cited by examiner

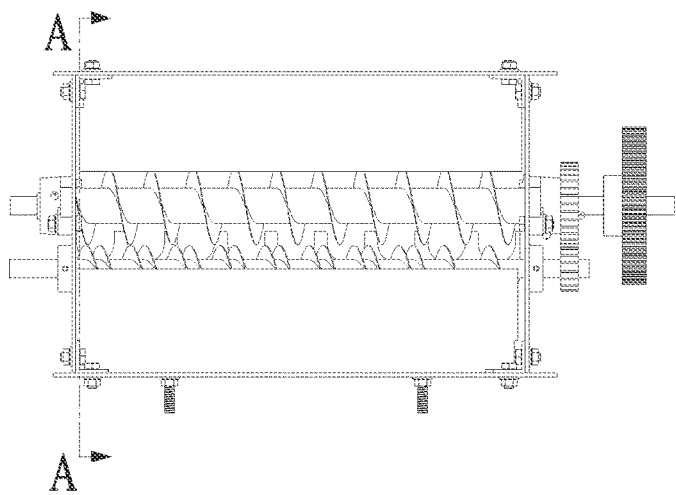
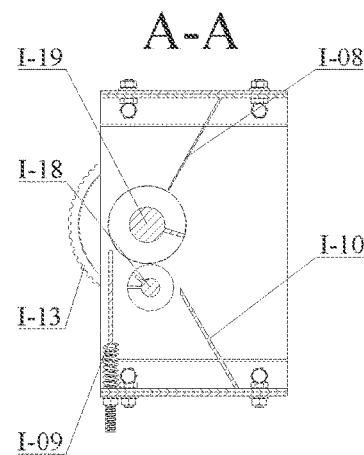
Fig. 4(a)　　　　　　　　　　　Fig. 4(b)
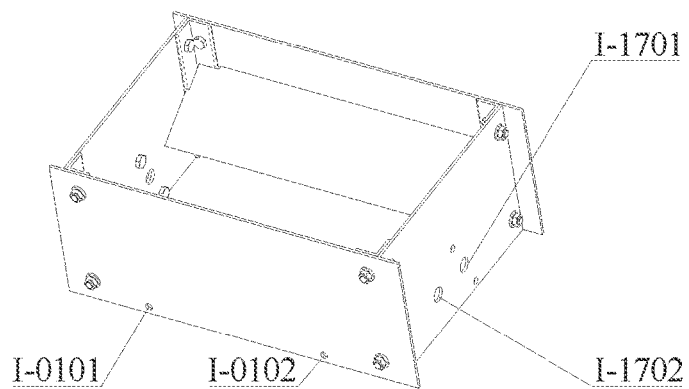
Fig. 5
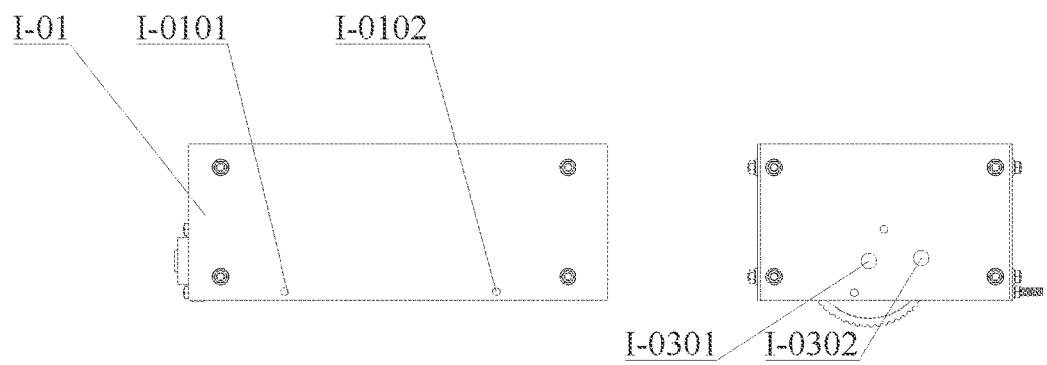
Fig. 5(a)　　　　　　　　　　　Fig. 5(b)

B-B

C-C

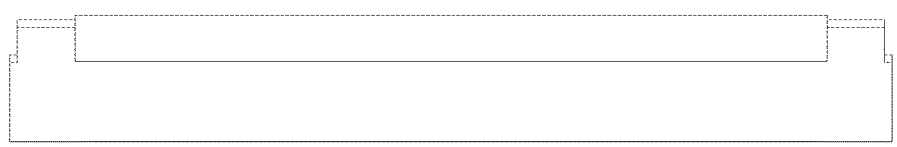
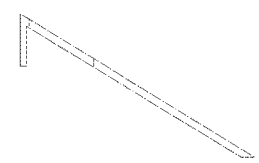
Fig. 9(a)　　　　　　　　　　　　　　Fig. 9(b)
Fig. 9(c)
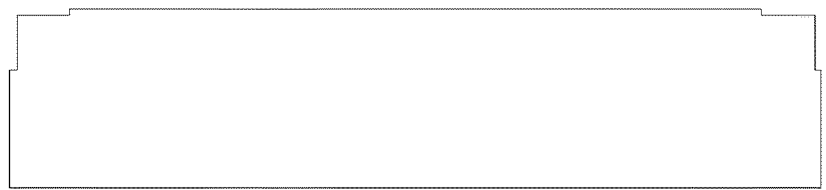
Fig. 10　　　　　　　　　　　　　　Fig. 10(a)
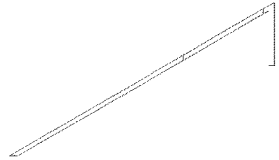
Fig. 10(b)　　　　　　　　　　　　　Fig. 10(c)
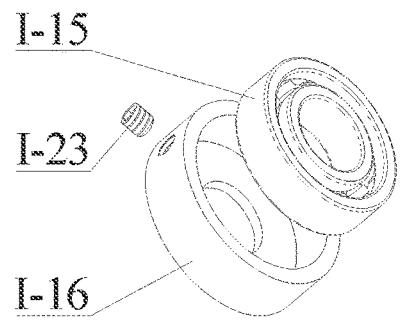
Fig. 11

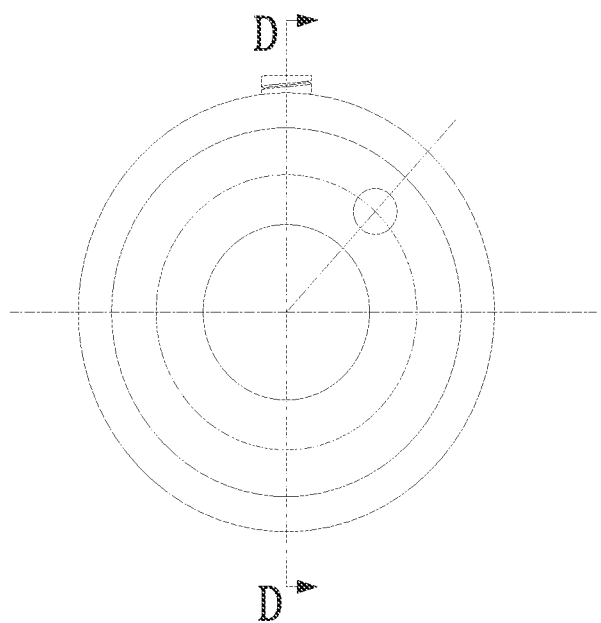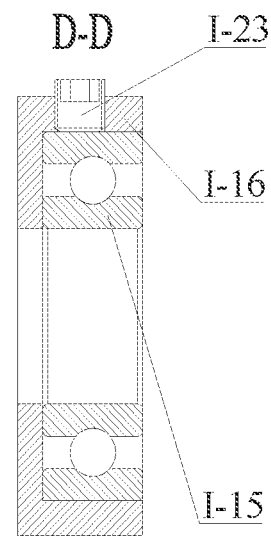
Fig. 11(a)　　　　　　Fig. 11(b)
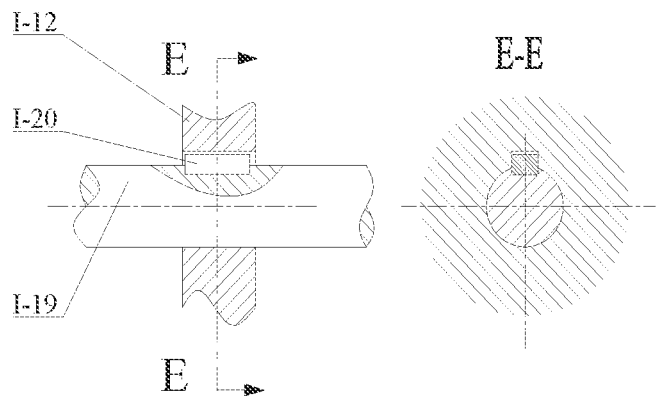
Fig. 12(a)　　　　　　Fig. 12(b)
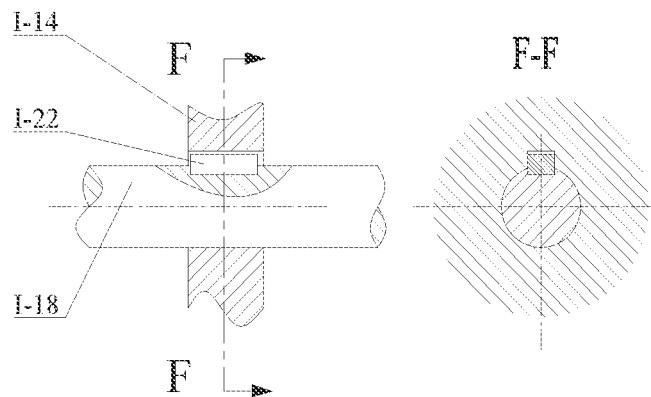
Fig. 13(a)　　　　　　Fig. 13(b)

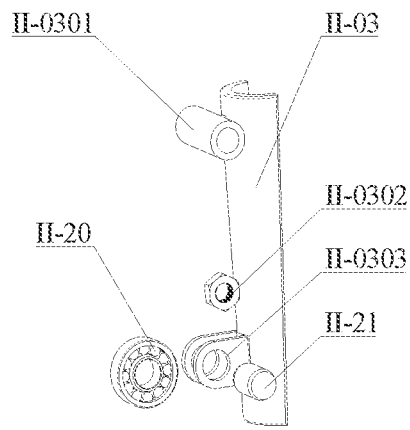
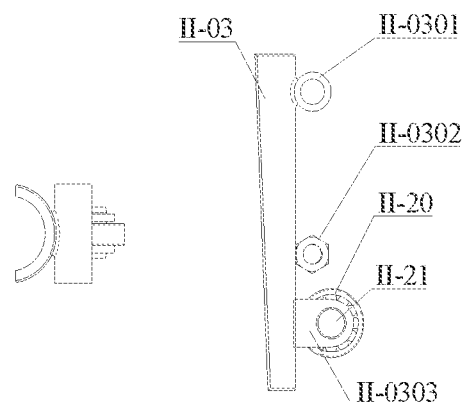
Fig. 19     Fig. 19(a)     Fig. 19(b)
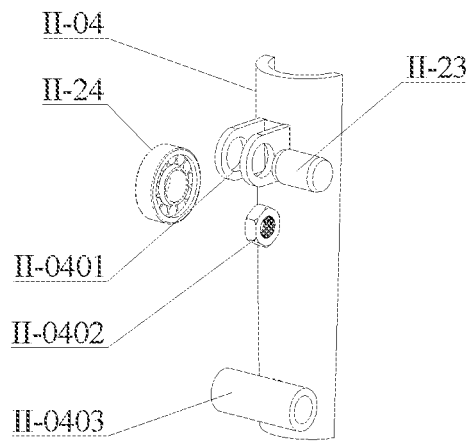
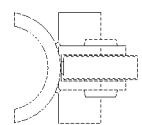
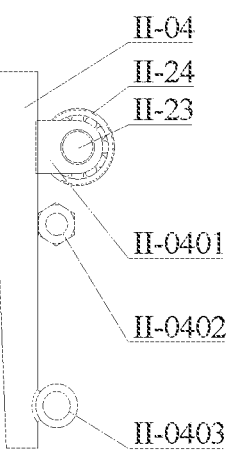
Fig. 20     Fig. 20(a)     Fig. 20(b)
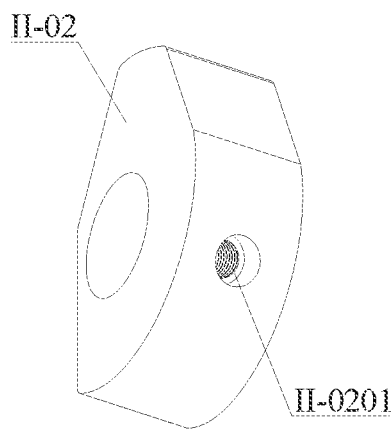
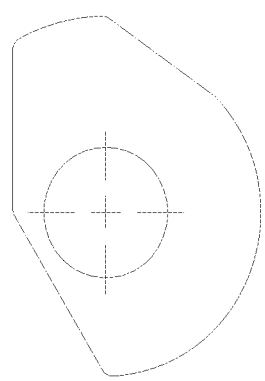
Fig. 21     Fig. 21(a)

MULTI-STATION ADAPTIVE WALNUT SHELL PRE-BREAKING SYSTEM

FIELD OF THE INVENTION

The present disclosure belongs to the technical field of walnut shell breaking, and specifically relates to a multi-station adaptive walnut shell pre-breaking system.

BACKGROUND OF THE INVENTION

Walnut kernels are very nutritious food and have the following advantages: 1. Walnut kernels tonify deficiency, strengthen body and provide nutrition. Animal experiments have proved that a mixed fat diet containing walnut oil can increase body weight and serum albumin, while the level of blood cholesterol rises slowly, so walnuts are a rare high-fat supplement. 2. Walnut kernels achieve anti-inflammatory and sterilization, care skin, and have direct antibacterial and anti-inflammatory effects. According to clinical reports, walnut tar zinc oxide paste prepared by mashing walnut kernels can treat dermatitis and eczema with an effective rate of up to 100%. Walnut kernels are rich in oil, which helps to moisturize skin and maintain vitality. 3. Walnut kernels are anti-cancer. Experiments have proved that active ingredients of walnuts have an inhibitory effect on S37 tumors in mice. Walnuts have certain inhibitory effects on various tumors, such as esophageal cancer, gastric cancer, nasopharyngeal cancer, lung cancer, thyroid cancer, and lymphosarcoma. In addition, walnuts have analgesic effects on cancer patients, increase white blood cells and protect the liver. 4. Walnut kernels invigorate the brain and delay senescence. Walnuts contain proteins required by the human body, have many ingredients and also contain unsaturated fatty acids necessary for human nutrition. These ingredients are important substances for cell metabolism of brain tissues, and can nourish brain cells and enhance brain function. 5. Walnut kernels purify blood and reduce cholesterol. Walnuts can reduce the absorption of cholesterol in intestines and expel debris from blood vessels, and purify blood to provide better fresh blood for the human body. Therefore, walnut kernels can prevent arteriosclerosis and lower cholesterol. In addition, walnuts can also be used to treat non-insulin-dependent diabetes. 6. Walnut kernels contain many proteins and unsaturated fatty acids necessary for the human body. These ingredients have a very good brain tonifying effect, and can nourish brain cells and enhance brain function. 7. Walnut kernels can effectively prevent arteriosclerosis and lower cholesterol. In addition, walnuts can also be used to treat non-insulin-dependent diabetes, and can increase white blood cells and protect the liver. 8. Walnut kernels contain a lot of vitamin E, and therefore have the effects of moistening lungs and blacking hair after regular consumption. 9. Walnut kernels relieve fatigue and stress. 10. Walnut kernels moisturize dryness to loosen bowel, are used for constipation due to intestinal dryness, have strong effects of promoting blood circulation for regulating menstruation and removing blood stasis for promoting tissue regeneration, and also have certain curative effect on cough suppression.

As the output of walnuts and the market demand increase, deep processing of walnuts has become increasingly prominent. Breaking of walnut shells to take kernels is the first problem faced in the deep processing. Because the walnut shell is composed of lignin, cellulose and hemicellulose, the walnut shell is hard and thick. Walnuts are irregular in appearance and have a plurality of partitions inside, walnut kernels are crisp, and shell-kernel gaps thereof are small, etc., which adds great difficulty to shelling for taking kernels. Due to the backwardness of processing technology, a manual method is often used in order to ensure the integrity of walnut kernels, that is, a "hand peeling method for walnuts". Walnuts in a mold are manually knocked with a hammer made of a flexible material to produce cracks on the surfaces of walnut shells. In this way, the shells can be removed perfectly without damaging the walnut kernels. The economic efficiency of walnut products are closely related to the rate of perfect kernels of walnuts. Walnuts are rich in grease, if the surfaces of walnuts are broken during processing, internal unsaturated fatty acids will overflow from the breakage and be oxidized immediately, which greatly affects the quality and nutritional value of walnuts. Therefore, if the rate of perfect kernels of walnuts is higher, the economic efficiency is higher, and the high rate of perfect kernels and the high efficiency are the focus of competition of contemporary walnut shell breaking and kernel taking machines. With the deepening of research on mechanized walnut shell breaking devices by domestic and international scholars, many new types of walnut shelling machines have appeared. At present, the traditional walnut shell breaking machines on the market break walnut shells to take kernels by using the physical characteristics of walnuts, including: a twisting method, a striking method, a shearing method, a squeezing method, and an ultrasonic shattering method. The first four methods are to break shells by rigidly applying pressure through mechanical devices based on certain gaps between walnut shells and kernels. The inventors found that, during the use of these machines, walnuts without any treatment are often directly put into a walnut sheller for processing, and such processing method has the disadvantages of low rate of perfect kernels and low efficiency.

Li Changhe, Li Jingyao, Wang Sheng, and Zhang Qiang from Qingdao University of Technology invented a walnut shelling and kernel taking device, comprising a frame, wherein the frame is provided with a case, a compaction and crushing device is disposed in the case, a stirring device is disposed at a discharge port of the compaction and crushing device, a sorting device is disposed at a discharge port of the stirring device, a power device is fixed to the lower wall of the case, and the power device is respectively connected to the sorting device and the compaction and crushing device through a V-belt. Walnuts are first broken by the compaction and crushing device, and then breakage of walnut shells and automatic separation of shells and kernels are implemented by hammering of the stirring device, and wind separation, velvet strip adhesion and the like of a separation device. With a height adjustment device, the walnut shelling and kernel taking device can adapt to process walnuts of different varieties, and therefore can be used in large-scale production operations, shorten labor time, save labor, reduce processing costs, better solve the problems of difficult walnut shelling and kernel taking and manual dependency, improve the shelling rate and high rate of perfect kernels, and achieve efficient, low-consumption and low-cost green production.

Liu Mingzheng, Li Changhe, and Zhang Yanbin from Qingdao University of Technology invented walnut shear squeezing shell-breaking flexible hammering kernel-taking equipment, comprising: a feeding hopper; a flat belt shear squeezing shell-breaking device for receiving materials from the feeding hopper; and a flexible helical blade hammering system for receiving primary shell-breaking materials conveyed by the flat belt shear squeezing shell-breaking device, and performing secondary hammering to break shells; wherein a walnut shell and walnut kernel separation device is disposed at the lower part of the flexible helical blade hammering system; the flat belt shear squeezing shell-breaking device and the walnut kernel separation device are connected to a drive system, and the drive system is connected to a power source I; the flexible helical blade hammering system is connected to a power source II; and all the devices above are each mounted on a frame.

Li Changhe, Xing Xudong, Ma Zhengcheng, Zhang Xiaoyang, Yang Fan, Xu Haonan, Zhou Yabo and Han Yiming from Qingdao University of Technology invented an automatic conveying and positioning walnut shell breaking device and a use method thereof. The walnut shell breaking device comprises: at least one walnut fixing mechanism and at least two striking rods disposed on a frame, wherein a walnut feeding hopper is disposed above the walnut fixing mechanism, a walnut shell breaking mold is provided with a walnut positioning hole, a positioning and quantitative feeding slider for covering the walnut positioning hole is disposed on each of two sides of the walnut positioning hole, a side wall of the walnut shell breaking mold is provided with at least two openings in communication with the walnut positioning hole, and the plurality of striking rods, driven by a moving mechanism, pass through the openings corresponding to the striking rods to strike walnuts in the walnut positioning hole. With a stirring device for feeding, the walnut shell breaking device is delicate in structure, efficient and extremely low in failure rate. A discharge hole of the feeding hopper and a through hole in a positioning and conveying mechanism according to this invention are in the shape of a walnut positioning cross section, so that stable and unchanged positioning results of walnuts can be ensured during a series of falling processes, the postures of walnuts are accurate and controllable, and automatic and controllable feeding of walnuts is achieved.

The overall shortcomings of these shell breaking and kernel taking machines are: walnut shells are not broken thoroughly, and there is still a certain gap from manual shelling in the rate of perfect kernels of walnuts. The existing walnut shell breaking related machines have excessively increased the shell breaking rate and shell breaking speed, but ignore the damage of walnut kernels during squeezing, resulting in a high walnut kernel breaking rate.

Shi Chaozhi invented a method for processing hickory nuts with cracks, comprising the following steps: providing dry hickory nuts; polishing the surfaces of the dry hickory nuts; soaking in water for 3 to 8 hours; fishing out the soaked hickory nuts to control water, then pouring directly into a frying utensil for stir-frying until cracks appear at the sharp openings of the hickory nuts, taking out and cooling; cutting down with a knife along the cracks of the hickory nuts to expand the cracks when the knife enters the cracks by 1 to 1.5 cm, being suitable for without splitting the hickory nuts into two halves; and squeezing slightly at the cracks of the hickory nuts to merge the cracks so as to approximately restore the original appearance of the hickory nuts. The hickory nuts prepared by this invention preserve the original appearance and flavor, the shells of the hickory nuts can be easily separated into two pieces by hand, it is quite convenient to eat kernels, the old and the young can eat the kernels, and the processing cost is also relatively low. In addition, the surfaces of the shells after eating are smooth, complete and full of artistic beauty, and can be made into handicrafts.

The method has the disadvantages of too complicated process and low efficiency, and because the hickory nuts are soaked, the taste is affected to a certain extent.

Zheng Jiahong, Zhao Kuipeng, Yan Ru, Xue Qicheng, Li Dajun, Yu Qincheng, Yang Rui, and Wang Fan from Shaanxi University of Science and Technology invented four-point squeezing type walnut shell breaking equipment, comprising a frame, a motor, a squeezing device, a driving device and a feeding device; wherein the motor is located on a motor mounting plate at the bottom of the frame, the motor is connected to the lower end of a main rocker of the driving device through a connecting rod, the motor drives the main rocker to swing, a push rod reciprocates linearly along a guide rail, the other end of the push rod is connected to a rocker of the squeezing device to drive the rocker to swing, the feeding device is fixed to the rocker of the squeezing device, and the squeezing device drives a feeding plate to feed materials; walnuts are placed in a hopper, the rocker swings left and right, a hole of the feeding plate coincides with a hole at the bottom of the hopper when the rocker swings right to a limit position, the walnuts fall into the hole of the feeding plate, the rocker swings to the left, the walnuts fall into squeezing holes when holes of a baffle coincide with the walnut squeezing holes, the baffle is opened after the squeezing is completed, and the walnuts fall into a discharge hopper; the walnuts are squeezed from four points at a time, so that the shells of walnuts are broken more thoroughly, and the walnut shell breaking equipment has the characteristics of complete shell breakage, high efficiency and convenient operation.

The equipment has the disadvantages that the squeezing force and squeezing deformation for walnuts of different sizes are different, so big walnuts may be crushed and small walnuts may not be cracked.

Xiao Zewen invented a walnut squeezing and peeling device, comprising two opposite squeezing ends and a sleeve in the middle of the two squeezing ends; the squeezing end comprises a rotating handle and a squeezing bolt which are fixedly connected with each other; the inner walls of two ends of the sleeve are respectively provided with internal threads with opposite spiral directions, and the squeezing bolts are provided with external threads matching with the internal threads; the ends of the squeezing bolts are provided with hemispherical grooves for fitting walnut shells; and a plurality of protrusions are distributed on the surfaces of the hemispherical grooves. Compared with the prior art, this utility model is easy to operate, saves time and effort, can guarantee the integrity of walnut kernels to the greatest extent, and saves operation time.

Although the device is easy to operate, saves time and effort, can guarantee the integrity of walnut kernels to the greatest extent, and saves operation time, because the stroke control is constant, big walnuts are still crushed and small walnuts are not cracked.

Li Changhe, Wang Yucheng, Xu Huicheng, Yuan Pengfei, Wang Xiaoming, Ma Zhengcheng, Deng Lele, and Hong Yuan from Qingdao University of Technology invented a system and method for squeezing walnuts into cracks based on precise self-positioning. The system comprises a driving mechanism, a transmission mechanism and a squeezing mechanism, wherein the driving mechanism generates a driving force to drive the transmission mechanism to reciprocate; the squeezing mechanism comprises a falling block and a squeezing block arranged oppositely, there is a gap between the falling block and the squeezing block, and the gap gradually decreases to position the falling walnuts; the transmission mechanism pushes the falling block and the squeezing block, to change the gap between the squeezing block and the falling block, so as to squeeze the walnuts falling between the squeezing block and the falling block to produce cracks. Under the premise of effectively reducing manpower and material resources and improving production efficiency, this invention adds a shell pre-breaking process to fully ensure the integrity of kernels. In addition, this invention optimizes the mechanisms, simplifies the mechanisms while improving the stability of the system, also reduces the total cost of the system, and achieves considerable production effects.

The device simplifies the mechanisms while improving the stability of the system, also reduces the total cost of the system, and achieves considerable production effects, whereas, the large contact area and large friction between the cam push rod and the slide rail result in the shortcomings of high power consumption, low energy efficiency ratio, crushing of big walnuts and no cracking of small walnuts.

Based on the above factors, the current idea of green and low-carbon development, and a full understanding of the walnut shell breaking structure, it is found that shell pre-breaking and then mechanical processing of walnuts are of great significance for promoting the walnut shell breaking technology and improving the economic efficiency. Moreover, the rate of perfect kernels of walnuts can be significantly improved by designing a multi-station adaptive walnut shell pre-breaking system in cooperation with existing machinery. However, the development of related devices is not perfect, and the existing shell pre-breaking devices are unsatisfactory in shell breaking effect, and usually have the disadvantages of high unit energy consumption and poor economy.

SUMMARY OF THE INVENTION

The purpose of the present disclosure is to provide a multi-station adaptive walnut shell pre-breaking system to overcome the above deficiencies of the prior art; the system integrates five functions of walnut feeding, self-positioning, self-adaption, precise squeezing and falling; two twisters of different structures rotate in opposite directions, and match with an adjustable spring partition to separate walnuts of different sizes and feed materials to a shell pre-breaking device orderly; multiple sets of squeezing U-shaped plates and falling U-shaped plates cooperate with each other to realize the self-adaption and self-positioning functions, that is, walnuts of various sizes can be positioned and precisely squeezed without damaging walnut kernels, so that walnut shells are cracked; the squeezing function is achieved by rolling between multiple sets of squeezing cams and bearings on the squeezing U-shaped plates; and the falling function is achieved by rolling between multiple sets of falling cams and bearings on the falling U-shaped plates.

The purpose of the present disclosure is to propose a multi-station adaptive walnut shell pre-breaking system. In order to achieve the purpose, the present disclosure adopts the following technical solution:

A multi-station adaptive walnut shell pre-breaking system, comprising a feeding device and a shell pre-breaking device fixed to a frame, the feeding device is disposed above the shell pre-breaking device, and a funnel device is disposed below the shell pre-breaking device;

The feeding device comprises a feeding box, a single-helix twister and a double-helix twister parallel to each other are disposed in the feeding box, the single-helix twister and the double-helix twister rotate in opposite directions, and an adjustable spring partition is disposed below the single-helix twister and the double-helix twister;

The shell pre-breaking device comprises a shell pre-breaking box, a plurality of squeezing stations are provided in the shell pre-breaking box, each of the squeezing stations is provided with a shell pre-breaking assembly, the shell pre-breaking assembly comprises a falling U-shaped plate and a squeezing U-shaped plate arranged oppositely, a first end of the falling U-shaped plate is hinged to the shell pre-breaking box, a second end of the falling U-shaped plate is pushed to move by a falling cam, the end of the squeezing U-shaped plate opposite to the first end of the falling U-shaped plate is pushed to move by a squeezing cam, the end of the squeezing U-shaped plate opposite to the second end of the falling U-shaped plate is hinged to the shell pre-breaking box, the squeezing cam is in an outer dwell state when the falling cam moves, and the falling cam is in an outer dwell state when the squeezing cam moves.

The operating principle of the walnut shell pre-breaking system of the present disclosure is:

Walnuts are fed by the feeding device, and the walnuts are graded by reverse rotation of the single-helix twister and the double-helix twister to retard the falling speed of walnuts, so that the shell pre-breaking device below corresponds to one walnut at each station when completing a squeezing and falling process. After the walnuts are graded and slowed down by the feeding device, small walnuts enter a plurality of stations on the left side of the shell pre-breaking device, and big walnuts enter a plurality of stations on the right side of the shell pre-breaking device, wherein when a walnut begins to fall above a corresponding station, the squeezing cam at this station is at the initial position of a first lift stroke, the falling cam is in an outer dwell state, and walnuts of various sizes will automatically fall to appropriate positions between the squeezing U-shaped plates and the falling U-shaped plates to realize the self-adaption and self-positioning functions. After the walnut is fixed between the two U-shaped plates, the squeezing cam enters a lift phase, and rolls with the bearing on the squeezing U-shaped plate to drive the squeezing U-shaped plate to move and match with the original falling U-shaped plate, thus squeezing the walnut into cracks. After the squeezing is completed, the squeezing cam enters a return phase, the walnut leaks through the funnel device, and then each station repeats the above work flow.

According to a further technical solution, the single-helix twister and the double-helix twister are each arranged horizontally, a first baffle is fixedly disposed above the single-helix twister, a second baffle is fixedly disposed above the double-helix twister, the first baffle and the second baffle are arranged oppositely on side walls of the feeding box, the first baffle and the second baffle tilt downward from the ends connected to the feeding box to the other ends, and a feeding inlet is formed between the first baffle and the second baffle.

According to a further technical solution, short helical blades and long helical blades are fixed on the outer side of a double-helix blade fixing shaft of the double-helix twister, the short helical blades and the long helical blades are arranged in parallel, and the short helical blades are shorter than the long helical blades.

According to a further technical solution, helical blades of the single-helix twister are tangent to the long helical blades.

According to a further technical solution, the adjustable spring partition comprises a U-shaped notched baffle arranged horizontally, one end of the U-shaped notched baffle is fixedly connected to the feeding box through two screw stem, the screw stem are sleeved with springs, the other end of the U-shaped notched baffle is provided with a plurality of U-shaped openings from which walnuts fall, and the U-shaped openings are correspondingly formed above the falling U-shaped plates and the squeezing U-shaped plates.

According to a further technical solution, the falling U-shaped plates and the squeezing U-shaped plates are each arranged vertically, the cross sections of the falling U-shaped plates and the squeezing U-shaped plates are both U-shaped, and the falling U-shaped plates and the squeezing U-shaped plates are opposite to form vertical cylindrical structures.

According to a further technical solution, the inner sides of the falling U-shaped plates and the squeezing U-shaped plates are provided with a plurality of trapezoidal grooves, there are gaps between the adjacent trapezoidal grooves, and the gaps are gradually reduced from top to bottom. According to a further technical solution, a side of the falling U-shaped plate is connected to the shell pre-breaking box through a falling U-shaped plate tension spring, and a side of the squeezing U-shaped plate is connected to the shell pre-breaking box through a squeezing U-shaped plate tension spring.

According to a further technical solution, the falling cams of the plurality of squeezing stations are staggered by a set angle and fixed to the same rotating shaft; and the squeezing cams of the plurality of squeezing stations are staggered by a set angle and fixed to the same rotating shaft. According to a further technical solution, the side of the falling U-shaped plate is hinged together with a falling U-shaped plate bearing by a pin, and the falling U-shaped plate bearing is in contact fit with the falling cam; the side of the squeezing U-shaped plate is hinged together with a squeezing U-shaped plate bearing by a pin, and the squeezing U-shaped plate bearing is in contact fit with the squeezing cam.

According to a further technical solution, the squeezing cam has two lift strokes, the contour of the squeezing cam corresponding to the first lift stroke is a quadratic polynomial curve, and the contour of the squeezing cam corresponding to the second lift stroke is a linear polynomial curve.

According to a further technical solution, the squeezing cam and the falling cam are each connected to a power device by a driving mechanism.

Beneficial effects of the present disclosure:

(1) The walnut shell pre-breaking system of the present disclosure can grade walnuts of different hardness and different sizes through the special feeding device, and can change the falling speed of walnuts by adjusting the speeds of the twisters and the distance from the adjustable spring partition below, thereby making full preparation for next step of shell pre-breaking.

(2) The walnut shell pre-breaking system of the present disclosure performs shell pre-breaking by means of a plurality of independent stations, and improves the rate of perfect kernels and the shell breaking efficiency through the cooperation with the feeding device, thereby making full preparation for next step of deep processing of walnuts.

(3) In the walnut shell pre-breaking system of the present disclosure, the mounting method of the cams can be adjusted, that is, the cams at adjacent stations are offset by a set angle clockwise or counterclockwise in sequence, and the differential operation of the plurality of stations reduces the materials requirements of driving components such as a main shaft, and requires low power of the motor; and the cams can also be mounted in the same direction to improve the efficiency of shell breaking.

(4) Two opposite U-shaped plates are used in the walnut shell pre-breaking system of the present disclosure, and multiple special trapezoidal grooves are engraved in the squeezing surfaces to increase squeezing points of walnut shells and improve the stress condition, so that the walnut shells are stressed uniformly, walnuts of various sizes can be squeezed, self-positioning in the horizontal direction is achieved during squeezing, and insufficient squeezing and damage to walnut kernels are avoided.

(5) The walnut shell pre-breaking system of the present disclosure squeezes walnuts more thoroughly, and can squeeze different parts of walnuts twice by using the squeezing cams with two lift strokes, with better effects.

(6) In the walnut shell pre-breaking system of the present disclosure, a bearing is mounted on the U-shaped squeezing plate, and the rolling friction between the bearing and the cam surface reduces energy loss and operating costs.

BRIEF DESCRIPTION OF THE DRAWINGS

The accompanying drawings constituting a part of the present application are intended to provide a further understanding of the present application, and the illustrative embodiments of the present application and the descriptions thereof are intended to interpret the present application and do not constitute improper limitations to the present application.

FIG. 4(*a*) is a top view of the feeding device;

FIG. 4(*b*) is a cross-sectional view of A-A in FIG. 4(*a*);

FIG. 5 is an axonometric view of a feeding box;

FIG. 5(*a*) is a front view of the feeding box;

FIG. 5(*b*) is a left view of the feeding box;

FIG. 7(*a*) is a front view of the single-helix twister;

FIG. 7(*b*) is a cross-sectional view of B-B in FIG. 7(*a*);

FIG. 8(*a*) is a front view of the double-helix twister;

FIG. 8(*b*) is a cross-sectional view of C-C in FIG. 8(*a*);

FIG. 9(*a*) is a rear view of the V-shaped baffle of the single-helix twister;

FIG. 9(*b*) is a left view of the V-shaped baffle of the single-helix twister;

FIG. 9(*c*) is a top view of the V-shaped baffle of the single-helix twister;

FIG. 10 is an axonometric view of a V-shaped baffle of the double-helix twister;

FIG. 10(*a*) is a top view of the V-shaped baffle of the double-helix twister;

FIG. 10(*b*) is a rear view of the V-shaped baffle of the double-helix twister;

FIG. 10(*c*) is a right view of the V-shaped baffle of the double-helix twister;

FIG. 11 is an exploded view of a bearing with a ring seat;

FIG. 11(*a*) is a front view of the bearing with a ring seat;

FIG. 11(*b*) is a cross-sectional view of D-D in FIG. 11(*a*);

FIG. 12(*a*) is a cross-sectional view of a connecting part of a large spur gear and the single-helix twister;

FIG. 12(*b*) is a cross-sectional view of E-E in FIG. 12(*a*);

FIG. 13(a) is a cross-sectional view of a connecting part of a small spur gear and the double-helix twister;

FIG. 13(b) is a cross-sectional view of F-F in FIG. 13(a);

FIG. 19 is a partial exploded view of a falling U-shaped plate;

FIG. 19(a) is a top view of the falling U-shaped plate;

FIG. 19(b) is a side view of the falling U-shaped plate;

FIG. 20 is a partial exploded view of a squeezing U-shaped plate;

FIG. 20(a) is a top view of the squeezing U-shaped plate;

FIG. 20(b) is a side view of the squeezing U-shaped plate;

FIG. 21 is an axonometric view of a squeezing cam;

FIG. 21(a) is a side view of the squeezing cam;

Figure 1:
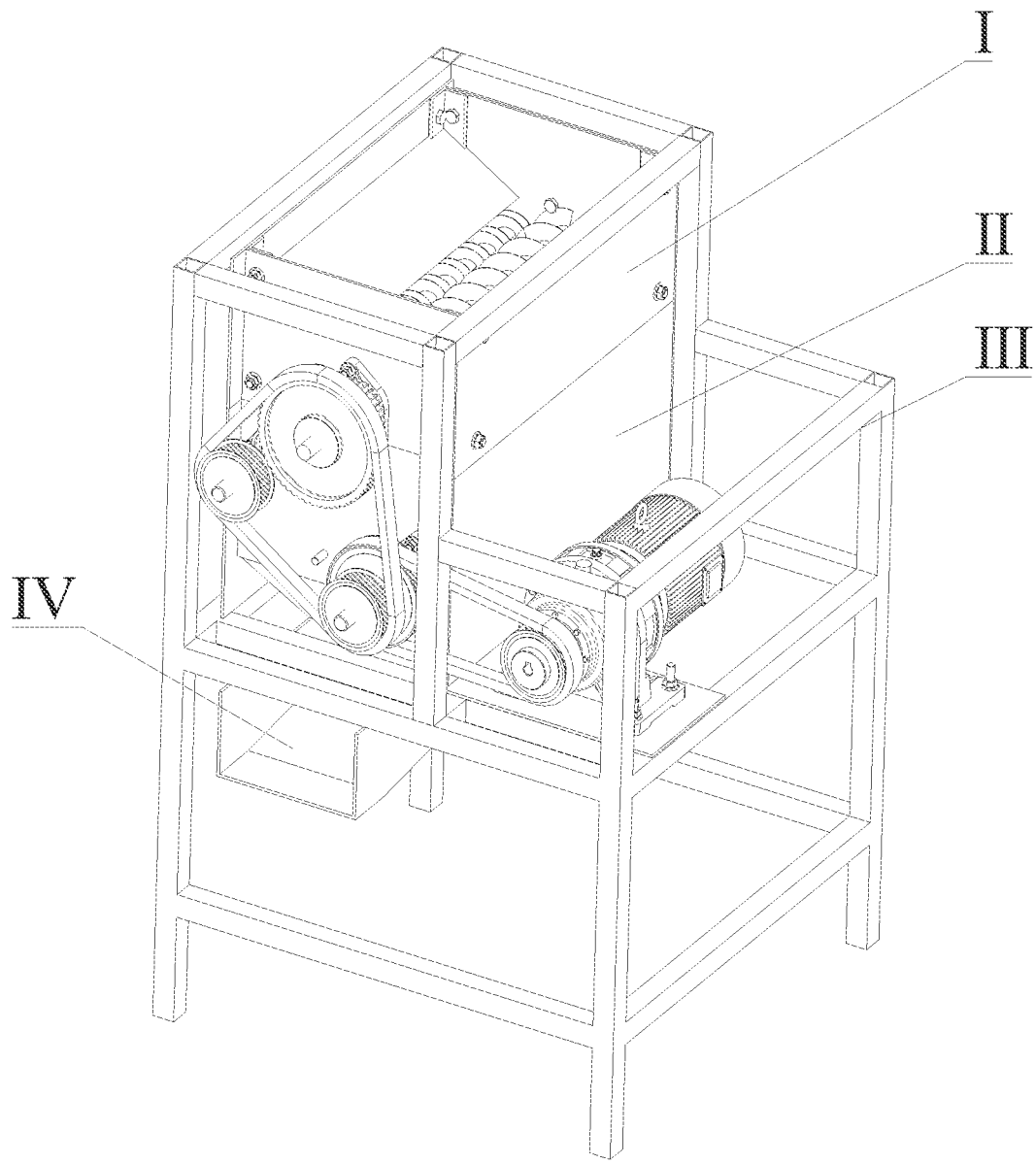
FIG. 1 is an axonometric view of a walnut shell pre-breaking system.

In the figures: feeding device I, shell pre-breaking device II, frame III, funnel device IV; I-01—feeding box front baffle, I-02—triangle iron connecting plate, I-03—feeding box left baffle, I-04—rhombic seat bearing, I-05—hexagon flange bolt, I-06—hexagon flange nut, I-07—feeding box rear baffle, I-08—single-helix twister V-shaped baffle, I-09—adjustable spring partition, I-10—double-helix twister V-shaped baffle, I-11—rhombic seat bearing, I-12—large spur gear, I-13—pulley I, I-14—small spur gear, I-15—deep groove ball bearing, I-16—ring bearing seat, I-17—feeding box right baffle, I-18—double-helix twister, I-19—single-helix twister, I-20—large spur gear positioning key, I-21—hexagon socket cap screw, I-22—small spur gear positioning key, I-23—set screw, II-01—shell pre-breaking box, II-02—squeezing cam, II-03—falling U-shaped plate, II-04—squeezing U-shaped plate, II-05—shaft I, II-06—rhombic seat bearing, II-07—shaft II, II-08—falling U-shaped plate tension spring, II-09—shaft III, II-10—pulley II, II-11—pulley III, II-12—pulley IV, II-13—shaft IV, II-14—squeezing U-shaped plate tension spring, II-15—squeezing cam set screw, II-16—hexagon flange bearing seat positioning nut, II-17—hexagon flange bearing seat positioning bolt, II-18—falling cam, II-19—falling cam positioning screw, II-20—falling U-shaped plate bearing, II-21—pin, II-22—hexagon socket cap positioning screw, II-23—pin, II-24—squeezing U-shaped plate bearing, III-01—motor, III-02—hexagon flange motor positioning bolt, III-03—hexagon flange motor positioning nut, III-04—motor positioning baffle, III-05—driving pulley, III-06—iron stand; I-0101—adjustable spring partition left positioning hole, I-0102—adjustable spring partition right positioning hole, I-0301—single-helix twister left positioning hole, I-0302—double-helix twister left positioning hole, I-1701—single-helix twister right positioning hole, I-1702—double-helix twister right positioning hole, I-0901—U-shaped notched baffle, I-0902—right screw stem, I-0903—right spring, I-0904—left screw stem, I-0905—left spring, I-1801—small spur gear positioning key slot, I-1802—double-helix blade fixing shaft, I-1803—short helical blade, I-1804—long helical blade, I-1901—large spur gear positioning key slot, I-1902—single-helix blade fixing shaft, I-1903—helical blade, II-0101—falling U-shaped plate box tension spring hanging ring, II-0102 squeezing U-shaped plate box tension spring hanging ring, II-0103—shaft I positioning hole, II-0104—shaft III positioning hole, II-0105—shaft II positioning hole, II-0106—shaft IV positioning hole, II-0201—squeezing cam positioning screw hole, II-0301—falling U-shaped plate sleeve, II-0302—falling U-shaped plate tension spring hanging ring, II-0303—falling U-shaped plate U-shaped bearing positioning groove, II-0401—squeezing U-shaped plate U-shaped bearing positioning groove, II-0402—squeezing U-shaped plate tension spring hanging ring, II-0403—squeezing U-shaped plate sleeve, II-1801—falling cam positioning screw hole, III-0101—ordinary round head flat key.

DETAILED DESCRIPTION OF EMBODIMENTS

It should be noted that the following detailed descriptions are exemplary and are intended to provide further descriptions of the present application. All technical and scientific terms used herein have the same meanings as commonly understood by those ordinary skilled in the art to which the present application belongs, unless specified otherwise.

It should be noted that terms used herein are intended to describe specific embodiments only rather than to limit the exemplary embodiments according to the present application. As used herein, unless otherwise clearly stated in the context, singular forms are also intended to include plural forms. In addition, it should also be understood that when the terms "contain" and/or "comprise" are used in the description, it indicates the presence of features, steps, operations, devices, ingredients, and/or combinations thereof.

For the convenience of description, the terms "upper", "lower", "left" and "right" in the present disclosure only indicate the upper, lower, left and right directions of the drawings, do not limit the structures, are only for the convenience of description and the simplification of description, do not indicate or imply that the devices or elements must have specific directions or be constructed and operated in specific directions, and therefore cannot be understood as limitations to the present disclosure.

As introduced in the background section, the inventors found that the existing shell pre-breaking devices are unsatisfactory in shell breaking effect, and usually have the disadvantages of high unit energy consumption and poor economy. In order to solve the above technical problems, the present application proposes a multi-station adaptive walnut shell pre-breaking system.

The present application provides a multi-station adaptive walnut shell pre-breaking system, comprising a feeding device and a shell pre-breaking device fixed to a frame, wherein the feeding device is disposed above the shell pre-breaking device, and a funnel device is disposed below the shell pre-breaking device;

The feeding device comprises a feeding box, a single-helix twister and a double-helix twister parallel to each other are disposed in the feeding box, the single-helix twister and the double-helix twister rotate in opposite directions, and an adjustable spring partition is disposed below the single-helix twister and the double-helix twister;

The shell pre-breaking device comprises a shell pre-breaking box, a plurality of squeezing stations are provided in the shell pre-breaking box, each of the squeezing stations is provided with a shell pre-breaking assembly, the shell pre-breaking assembly comprises a falling U-shaped plate and a squeezing U-shaped plate arranged oppositely, a first end of the falling U-shaped plate is hinged to the shell pre-breaking box, a second end of the falling U-shaped plate is pushed to move by a falling cam, the end of the squeezing U-shaped plate opposite to the first end of the falling U-shaped plate is pushed to move by a squeezing cam, the end of the squeezing U-shaped plate opposite to the second end of the falling U-shaped plate is hinged to the shell pre-breaking box, the squeezing cam is in an outer dwell state when the falling cam moves, and the falling cam is in an outer dwell state when the squeezing cam moves.

Embodiment 1

The walnut shell pre-breaking system disclosed by this embodiment is further described below with reference to FIG. 1 to FIG. 26.

As shown in FIG. 1, the walnut shell pre-breaking system is composed of four parts: a feeding device I, a shell pre-breaking device II, a frame III, and a funnel device IV. The feeding device I is disposed above the shell pre-breaking device II, a feeding box front baffle I-01 and a feeding box rear baffle I-07 in the feeding device I are connected to a shell pre-breaking box II-01 in the shell pre-breaking device II together by welding, and the shell pre-breaking box II-01 is connected to an iron stand III-06 in the frame III by welding. Wherein, a pulley I I-13, a pulley IV II-12, and a pulley III II-11 are connected together by a belt, and a pulley II II-10 is connected to a driving pulley III-05 together by a belt. The funnel device IV is disposed below the pre-breaking shell device II, and the funnel device IV is connected to the shell pre-breaking box II-01 by welding.

Figure 24:
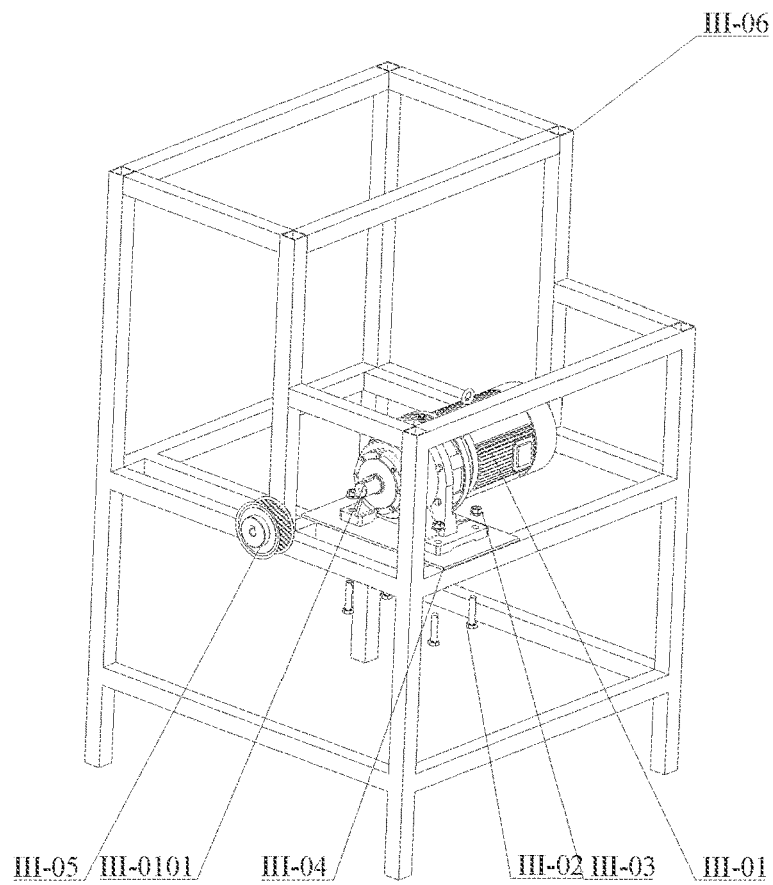
FIG. 24 is an exploded view of a frame.
Figures 25A, 25B:
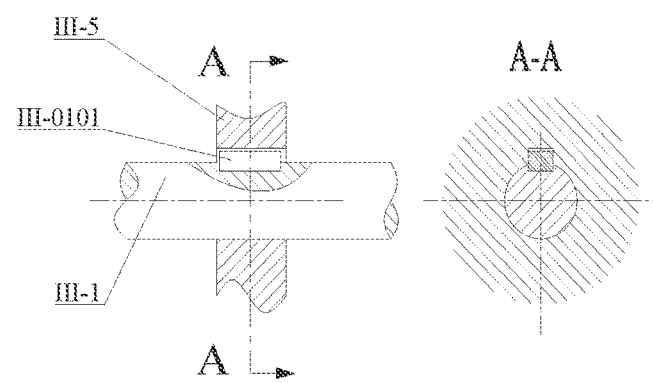
FIG. 25(a) is a cross-sectional view of a connecting part of a driving pulley and a motor.
FIG. 25(b) is a cross-sectional view of A-A in FIG. 25(a)

As shown in FIG. 24, the frame III is formed by a plurality of iron stands III-06, a motor III-01 is connected to a motor positioning baffle III-04 together by hexagon flange motor positioning bolts III-02 and hexagon flange motor positioning nuts III-03, the motor positioning baffle III-04 is connected to the iron stands III-06 together by welding, and a driving pulley III-05 is connected to a key slot on a motor shaft through an ordinary round head flat key III-0101.

The motor III-01 is a power device of the shell pre-breaking system of the present disclosure. The motor III-01 drives a single-helix twister and a double-helix twister of the feeding device I through a drive mechanism, and the squeezing cam and falling cam of the shell pre-breaking device II move. The drive mechanism is composed of pulleys, gears, a drive belt, etc. The motor III-01 is driven by the belt to drive the falling cam in the shell pre-breaking device to move, the other pulley at a shaft end that cooperates with the falling cam drives the single-helix twister and the squeezing cam to move simultaneously by belt drive, and the single-helix twister drives the double-helix twister to rotate reversely by gear engagement.

Figure 2:
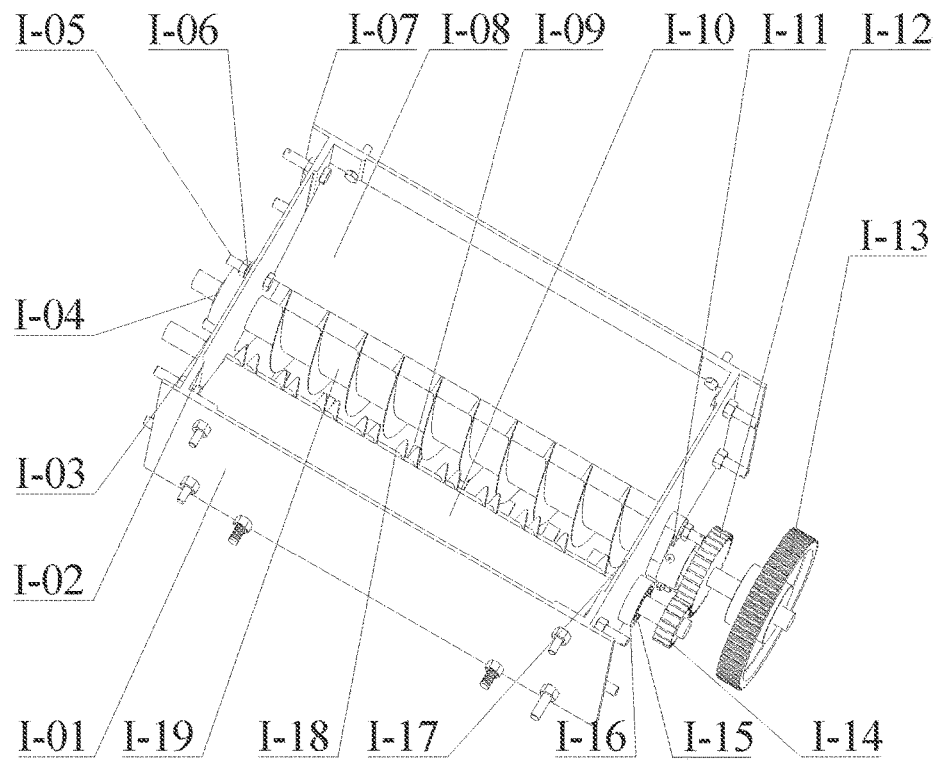
FIG. 2 is an axonometric view of a feeding device.
Figure 3:
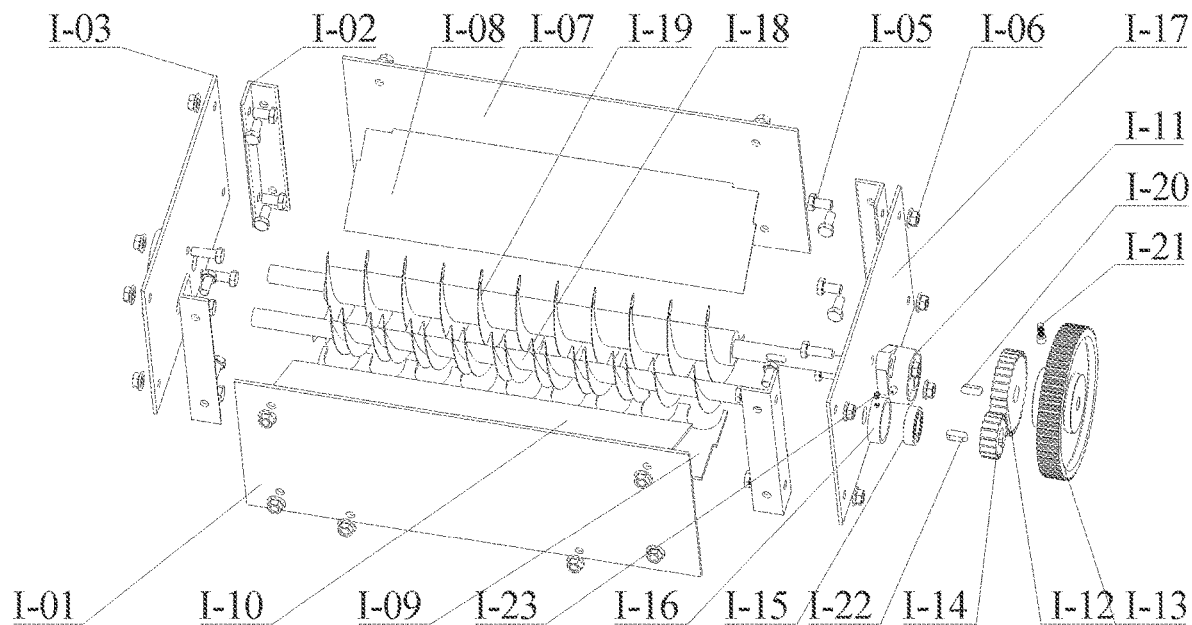
FIG. 3 is an exploded view of the feeding device.

As shown in FIG. 2 and FIG. 3, a feeding box left baffle I-03 and the feeding box rear baffle I-07 are positioned and clamped to a triangle iron connecting plate I-02 by four sets of same hexagon flange bolts I-05 and hexagon flange nuts I-06; the feeding box rear baffle I-07 and a feeding box right baffle I-17 are positioned and clamped to a triangle iron connecting plate I-02 by four sets of same hexagon flange bolts I-05 and hexagon flange nuts I-06; the feeding box right baffle I-17 and the feeding box front baffle I-01 are positioned and clamped to a triangle iron connecting plate I-02 by four sets of same hexagon flange bolts I-05 and hexagon flange nuts I-06; the feeding box front baffle I-01 and the feeding box left baffle I-03 are positioned and clamped to a triangle iron connecting plate I-02 by four sets of same hexagon flange bolts I-05 and hexagon flange nuts I-06; and the above constitutes a main body of the feeding box.

As shown in FIG. 4(*a*) and FIG. 4(*b*), the single-helix twister I-19 and the double-helix twister I-18 are arranged in parallel in the feeding box, and the single-helix twister I-19 and the double-helix twister I-18 are each arranged horizontally and rotate in opposite directions; the outer diameters of helical blades I-1903 in the single-helix twister I-19 are tangent to the outer diameters of long helical blades I-1804 in the double-helix twister I-18, short helical blades I-1803 and the long helical blades I-1804 are staggered by certain distances, and the purpose that the single-helix twister I-19 and the double-helix twister I-18 rotate in opposite directions is achieved by engagement between a large spur gear I-12 and a small spur gear I-14, wherein the double-helix blade region of the double-helix twister I-18 mainly functions to separate large-diameter walnuts, and to cause the separated small-diameter walnuts to fall orderly through relative rotation with the helical blades I-1903 of the single-helix twister I-19, and the single-helix blade region on the right side of the double-helix twister I-18 retards the falling speed of the separated large-diameter walnuts through relative rotation with the helical blades I-1903 of the single-helix twister I-19.

As shown in FIG. 5 and FIG. 5(*b*), a single-helix blade fixing shaft I-1902 in the single-helix twister I-19 penetrates through a single-helix twister right positioning hole I-1701 on the feeding box right baffle I-17 and a single-helix twister left positioning hole I-0301 on the feeding box left baffle I-03 respectively, and the left and right shaft ends of the single-helix blade fixing shaft I-1902 match with a rhombic seat bearing I-04 and a rhombic seat bearing I-11 respectively, and are fixed to the feeding box left baffle I-03 and the feeding box right baffle I-17 by hexagon flange bolts I-05 and hexagon flange nuts I-06.

A double-helix blade fixing shaft I-1802 in the double-helix twister I-18 penetrates through a double-helix twister right positioning hole I-1702 on the feeding box right baffle I-17 and a double-helix twister left positioning hole I-0302 on the feeding box left baffle I-03 respectively, and the left and right shaft ends of the double-helix blade fixing shaft I-1802 match with two deep groove ball bearings I-15 respectively, wherein the two deep groove ball bearings I-15 are respectively fixed to two ring bearing seats I-16 by set screws I-23, and the two ring bearing seats I-16 are respectively fixed to the feeding box right baffle I-17 and the feeding box left baffle I-03 by welding; the large spur gear I-12 cooperates with a large spur gear positioning key slot I-1901 on the single-helix twister I-19 through a large spur gear positioning key I-20, and the small spur gear I-14 cooperates with a small spur gear positioning key slot I-1801 on the double-helix twister I-18 through a small spur gear positioning key I-22, so that the large spur gear I-12 engages with the small spur gear I-14; the pulley I I-13 is fixed to a right shaft end position of the large spur gear positioning key slot I-1901 on the single-helix blade fixing shaft I-1902 through a hexagon socket cap screw I-21; the large spur gear I-12 drives the two twisters to rotate in opposite directions by engagement drive to separate walnuts of different sizes, and the falling speed of walnuts is retarded by friction between the helical blades and the surfaces of the walnuts.

A single-helix twister V-shaped baffle I-08 (i.e., a first baffle) is fixed to the feeding box rear baffle I-07 by welding, and the single-helix twister V-shaped baffle I-08 is tangent to the helical blades of the single-helix twister I-19, tilts downward, and functions to prevent the walnuts from falling outside the opening of the U-shaped plate of the shell pre-breaking device with the rotation of the single-helix twister I-19; a double-helix twister V-shaped baffle I-10 (i.e., a second baffle) is fixed to the feeding box front baffle I-01 by welding, and the double-helix twister V-shaped baffle I-10 is tangent to the helical blades of the double-helix twister I-18, tilts downward, and functions to prevent the walnuts from falling outside the opening of the U-shaped plate of the shell pre-breaking device with the rotation of the double-helix twister I-18. A feeding inlet is formed between the single-helix twister V-shaped baffle I-08 and the double-helix twister V-shaped baffle I-10.

Figure 6:
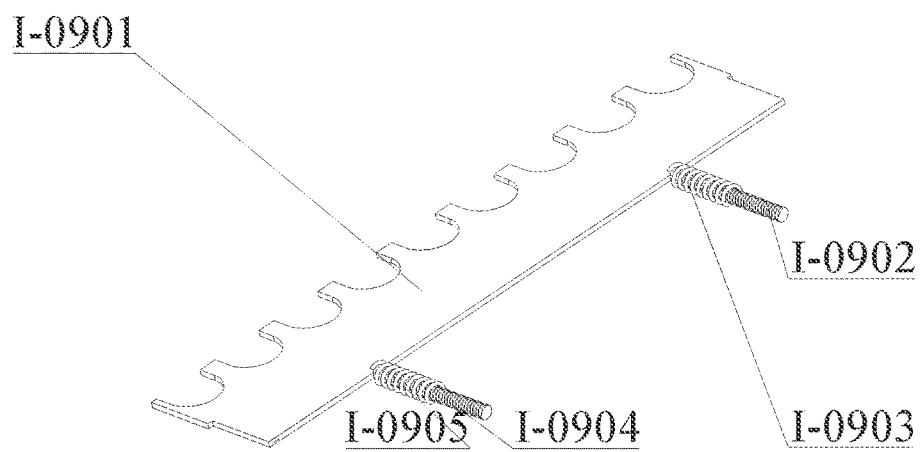
FIG. 6 is an axonometric view of an adjustable spring partition.

As shown in FIG. 6, the adjustable spring partition I-09 consists of five parts: a U-shaped notched baffle I-0901, a left spring I-0905, a left screw stem I-0904, a right spring I-0903, and a right screw stem I-0902, wherein the left screw stem I-0904 and the right screw stem I-0902 are fixed to the U-shaped notched baffle I-0901 by welding, the left spring I-0905 and the right spring I-0903 are sleeved on the left screw stem I-0904 and the right screw stem I-0902 respectively, the left screw stem I-0904 and the right screw stem I-0902 penetrate through an adjustable spring partition left positioning hole I-0101 and an adjustable spring partition right positioning hole I-0102 of the feeding box front baffle I-01 and are fixed to the feeding box front baffle I-01 through two hexagon flange nuts I-06 respectively, the size of the U-shaped notched baffle I-0901 relative to the walnut inlet between the squeezing U-shaped plate and the feeding U-shaped plate is adjusted by rotating the two hexagon flange nuts I-06 matching with the screws, and the width of U-shaped notches in the U-shaped notched baffle I-0901 is the same as the maximum diameter of walnuts. The adjustable spring partition I-09 is mounted below the two twisters, and is tangent to the twisters.

Figure 7:
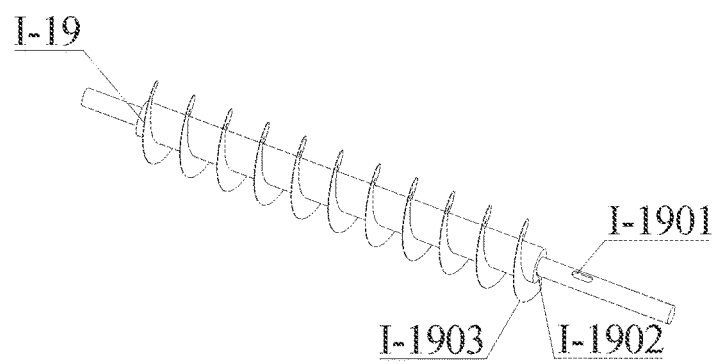
FIG. 7 is an axonometric view of a single-helix twister.
Figure 7A:
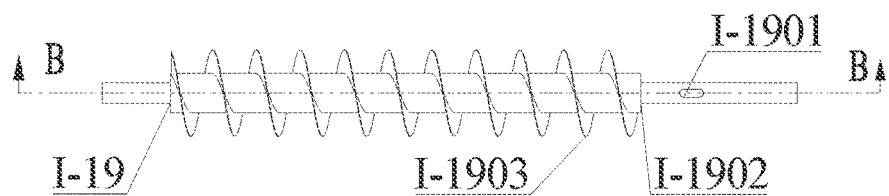
Figure 7B:
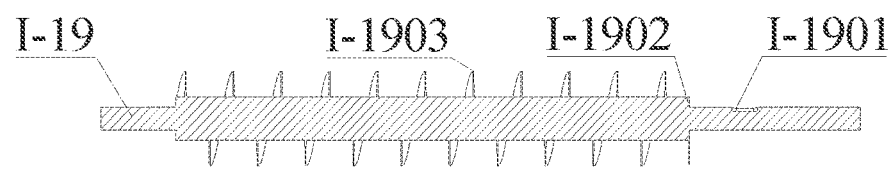
Figure 8:
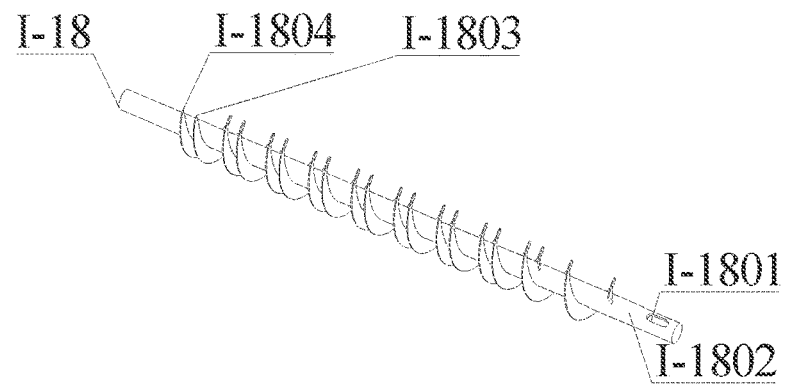
FIG. 8 is an axonometric view of a double-helix twister.
Figure 8A:
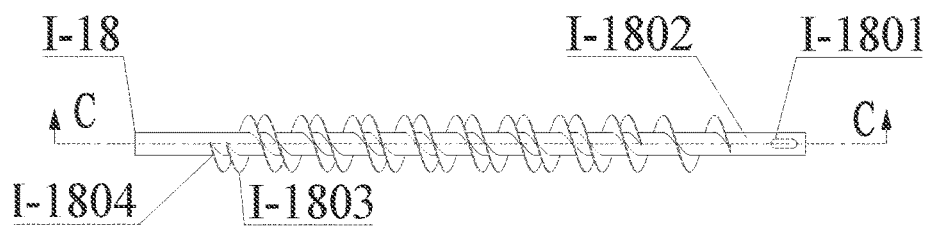
Figure 8B:
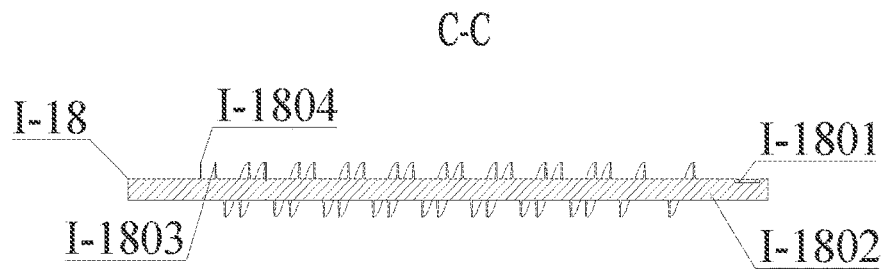
Figure 9:
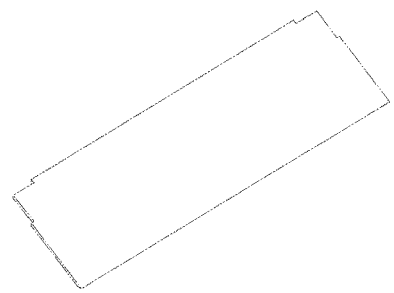
FIG. 9 is an axonometric view of a V-shaped baffle of the single-helix twister.
Figure 14:
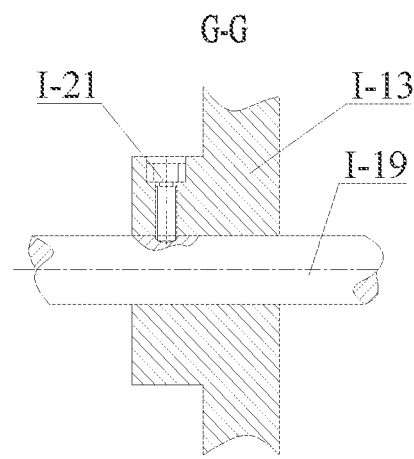
FIG. 14 is a cross-sectional view of a connecting part of a pulley I and the single-helix twister.
Figure 15:
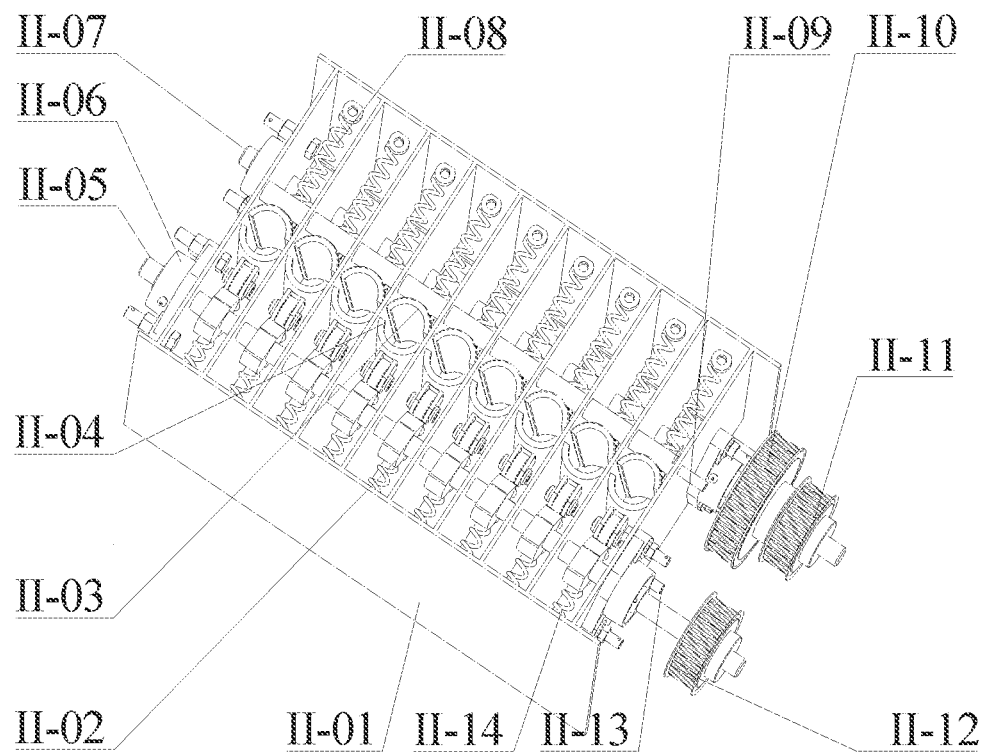
FIG. 15 is an axonometric view of a shell pre-breaking device.
Figure 16:
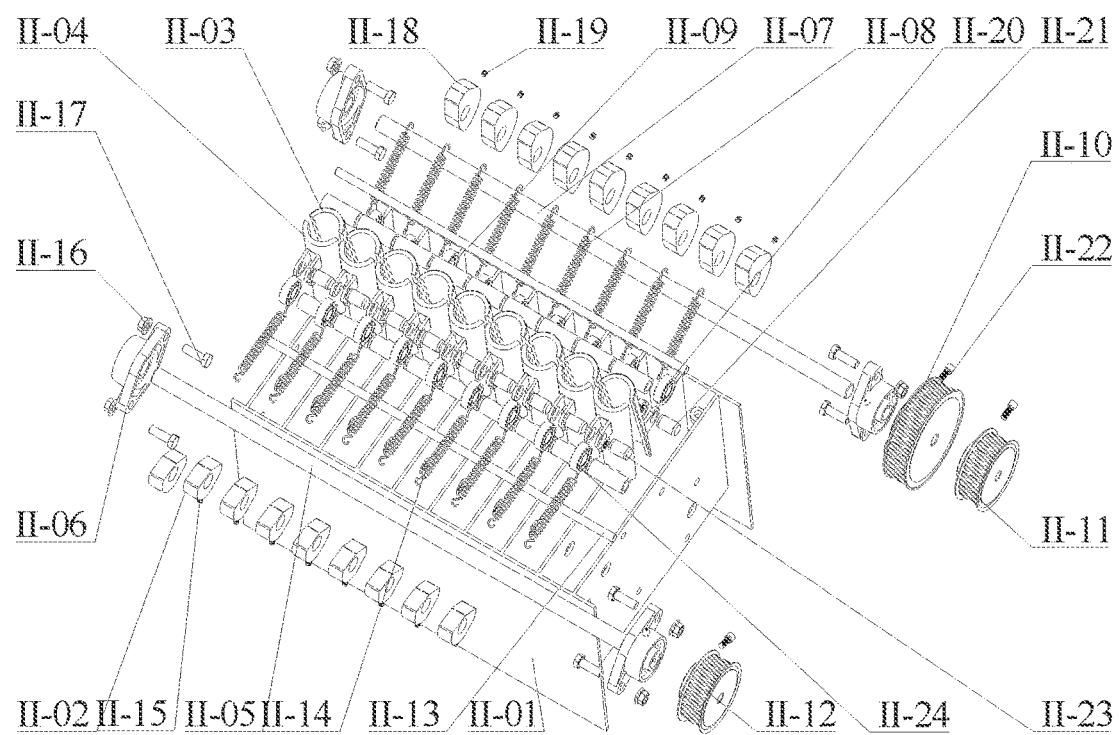
FIG. 16 is an exploded view of the shell pre-breaking device.
Figure 17A:
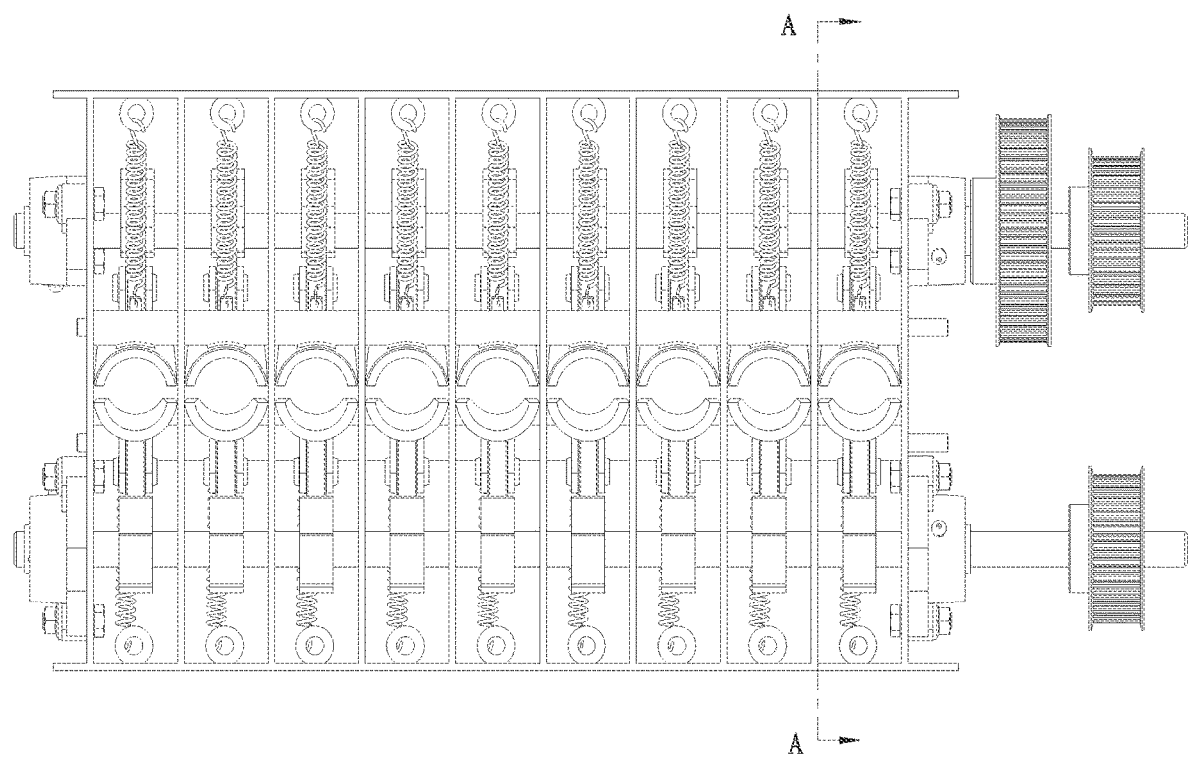
FIG. 17(a) is a top view of the shell pre-breaking device.
Figure 17B:
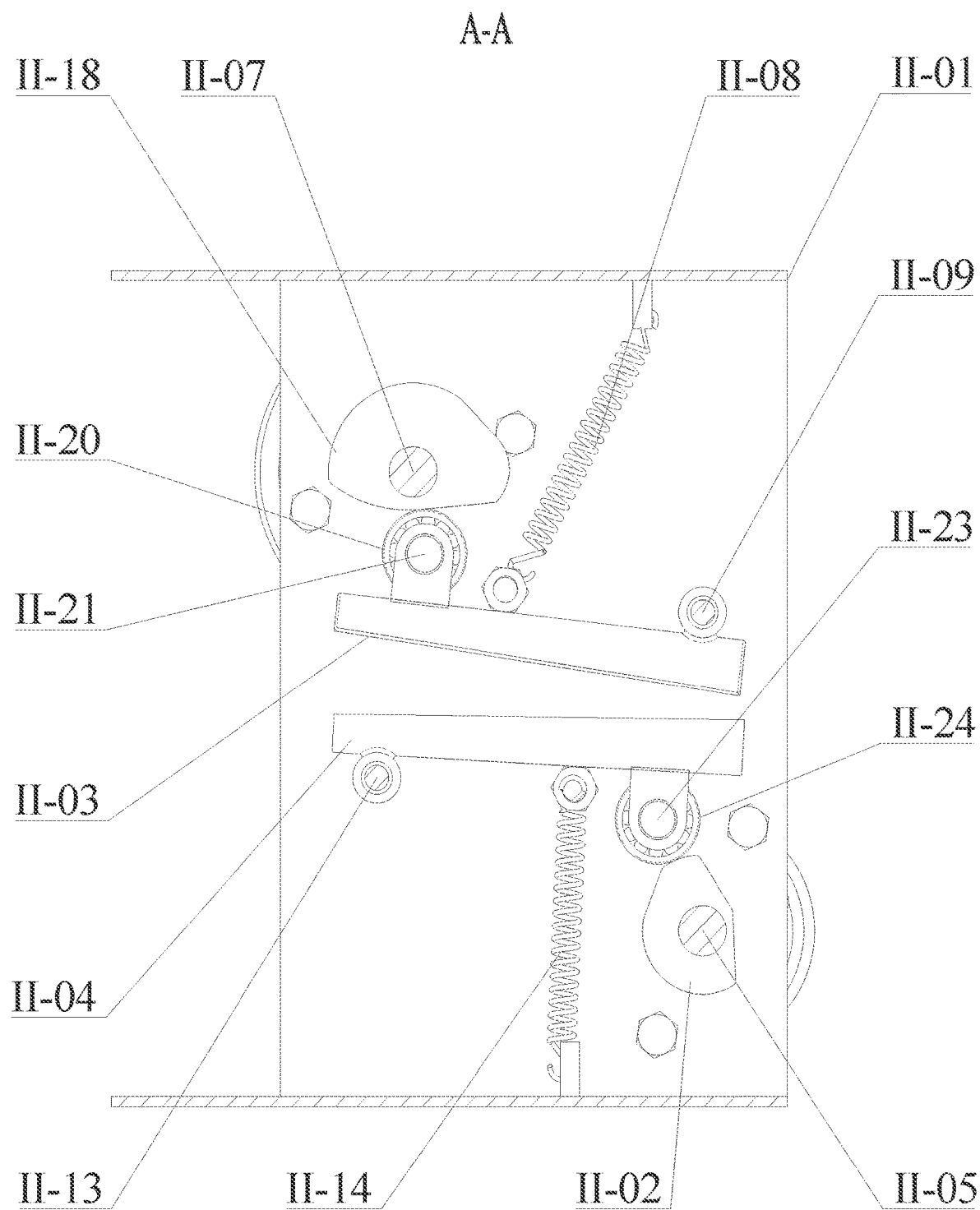
FIG. 17(b) is a cross-sectional view of A-A in FIG. 17(a)
Figure 17C:
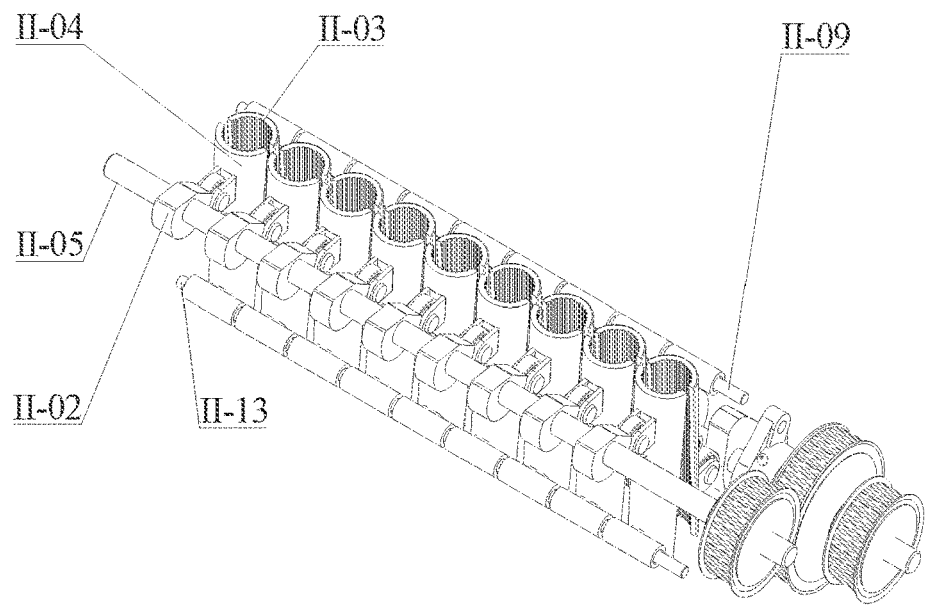
FIG. 17(c) is a schematic diagram of mounting positions of squeezing U-shaped plates.

As shown in FIG. 7, FIG. 7(a) and FIG. 7(b), the single-helix twister I-19 is composed of helical blades I-1903 and a single-helix blade fixing shaft I-1902, the helical blades I-1903 are fixed to the single-helix blade fixing shaft I-1902 by welding, and the single-helix blade fixing shaft I-1902 is engraved with a large spur gear positioning key slot I-1901;

As shown in FIG. 8, FIG. 8(a) and FIG. 8(b), the double-helix twister I-18 is composed of long helical blades I-1804, short helical blades I-1803 and a double-helix blade fixing shaft I-1802, wherein the long helical blades I-1804 and the short helical blades I-1803 have the same specifications except for their different lengths, and are spaced by certain distances and fixed to the double-helix blade fixing shaft I-1802 by welding, and the double-helix blade fixing shaft I-1802 is engraved with a small spur gear positioning key slot I-1801. The short helical blades I-1803 are shorter than the long helical blades I-1804, and the both are arranged from the left end of the double-helix blade fixing shaft I-1802 to the right. A double-helix blade region is formed on the left side of the double-helix twister I-18, and a single-helix blade region is formed on the right side.

Figure 18:
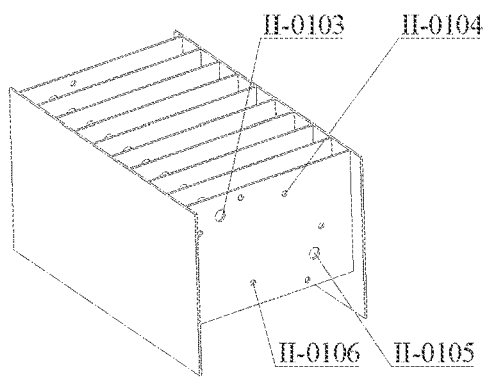
FIG. 18 is an axonometric view of a shell pre-breaking box.
Figure 18A:
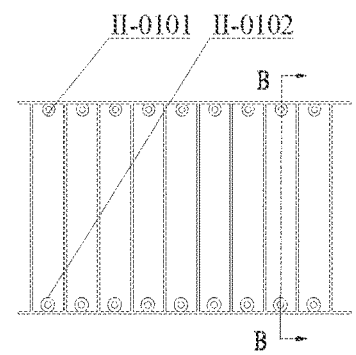
FIG. 18(a) is a top view of the shell pre-breaking box.
Figure 18B:
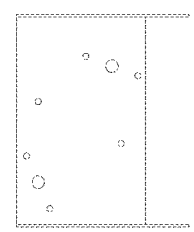
FIG. 18(b) is a right view of the shell pre-breaking box.
Figure 18C:
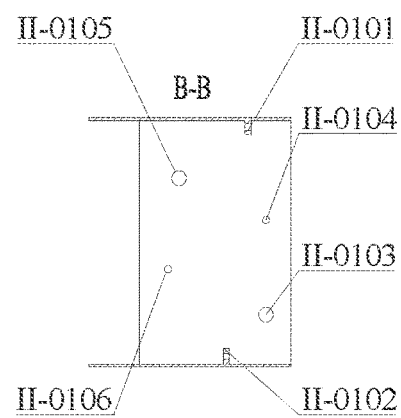
FIG. 18(c) is a cross-sectional view of B-B in FIG. 18(a)

As shown in FIG. 18, in this embodiment, nine squeezing stations are provided in the shell pre-breaking box II-01, the adjacent squeezing stations are separated by a partition, each station is correspondingly provided with a set of shell pre-breaking assembly, the shell pre-breaking assembly comprises a pair of squeezing U-shaped plate and falling U-shaped plate and a pair of squeezing cam and falling cam, and the squeezing cam and the falling cam are fixed to two shafts matching with the shell pre-breaking box by positioning screws; the squeezing cams are mounted in two manners: the squeezing cams are offset by 40° clockwise or counterclockwise in sequence from the cam at the outermost station, and all the squeezing cams are mounted in the same direction; and regardless of the mounting method, the size and lift stroke of the falling cams and the squeezing cams satisfy: the squeezing cams are in an outer dwell state when the falling cams move, and the falling cams are in an outer dwell state when the squeezing cams move. The shell pre-breaking assembly will be described in detail below.

As shown in FIG. 16, FIG. 17(a) and FIG. 17(b), FIG. 17(c), and FIG. 23, nine squeezing cams are provided in this embodiment and correspond to nine squeezing stations, the nine squeezing cams II-02 are staggered at a certain angle and fixed to a shaft I II-05 by squeezing cam positioning screws II-15, the squeezing cam positioning screws II-15 pass through squeezing cam positioning screw holes II-0201 of the squeezing cams II-02 to fixedly connect the squeezing cams II-02 with the shaft I II-05, the shaft I II-05 passes through a shaft I positioning hole II-0103 on the shell pre-breaking box II-01, each squeezing cam II-02 is located in the middle of each station of the shell pre-breaking box II-01, and rhombic seat bearings II-06 match with two shaft ends of the shaft I II-05 respectively and are fixed to the shell pre-breaking box II-01 by hexagon flange bearing seat positioning bolts II-17 and hexagon flange bearing seat positioning nuts II-16; the pulley IV II-12 is fixed to the right end of the shaft I II-05 by a hexagon socket cap positioning screw II-22; the squeezing U-shaped plates II-04 are located in the nine stations of the shell pre-breaking box II-01, a squeezing U-shaped plate sleeve II-0403 is fixedly disposed on a side of each squeezing U-shaped plate II-04, the squeezing U-shaped plate sleeve II-0403 is hinged to the shell pre-breaking box II-01 by a shaft IV II-13, the squeezing U-shaped plate sleeve II-0403 is in clearance fit with the shaft IV II-13, a squeezing U-shaped plate bearing II-24 is hinged together with a squeezing U-shaped plate U-shaped bearing positioning groove II-0401 of the squeezing U-shaped plate II-04 by a pin II-23, wherein the pin II-23 is in clearance fit with the squeezing U-shaped plate bearing II-24 and in interference fit with the squeezing U-shaped plate U-shaped bearing positioning groove II-0401, one end of a squeezing U-shaped plate tension spring II-14 is connected to a squeezing U-shaped plate tension spring hanging ring II-0402, and the other end of the squeezing U-shaped plate tension spring II-14 is connected to a squeezing U-shaped plate box tension spring hanging ring II-0102, the squeezing U-shaped plate bearing II-24 is always in contact with the squeezing cam II-02 under the action of the squeezing U-shaped plate tension spring II-14, and the rolling friction between the cam and the bearing reduces energy consumption and improves economic efficiency; the shaft IV II-13 is in interference fit with a shaft IV positioning hole II-0106 on the shell pre-breaking box II-01;

The nine falling cams II-18 are also staggered at a certain angle and fixed to a shaft II II-07 by falling cam positioning screws II-19, the falling cam positioning screws II-19 pass through falling cam positioning screw holes II-1801 of the falling cams II-18 to fixedly connect the falling cams II-18 with the shaft II II-07, the shaft II II-07 passes through a shaft II positioning hole II-0105 on the shell pre-breaking box II-01, each falling cam II-18 is located in the middle of each station of the shell pre-breaking box II-01, and rhombic seat bearings II-06 match with two shaft ends of the shaft II II-07 respectively and are fixed to the shell pre-breaking box II-01 by hexagon flange bearing positioning bolts II-17 and hexagon flange bearing positioning nuts II-16; the pulley II II-10 and the pulley III II-11 are fixed to the right end of the shaft II II-07 by hexagon socket cap positioning screws II-22; the falling U-shaped plates II-03 are located in the nine stations of the shell pre-breaking box II-01, a falling U-shaped plate sleeve II-0301 is fixedly disposed on a side of each falling U-shaped plate II-03, the falling U-shaped plate sleeve II-0301 is hinged to the shell pre-breaking box II-01 by a shaft III II-09, the falling U-shaped plate sleeve II-0301 is in clearance fit with the shaft III II-09, a falling U-shaped plate bearing II-20 is hinged together with a falling U-shaped plate U-shaped bearing positioning groove II-0303 of the falling U-shaped plate II-03 by a pin II-21, wherein the pin II-21 is in clearance fit with the falling U-shaped plate bearing II-20 and in interference fit with the falling U-shaped plate U-shaped bearing positioning groove II-0303, one end of a falling U-shaped plate tension spring II-08 is connected to a falling U-shaped plate tension spring hanging ring II-0302 and the other end of the falling U-shaped plate tension spring II-08 is connected to a falling U-shaped plate box tension spring hanging ring II-0101, the falling U-shaped plate bearing II-20 is always in contact with the falling cam II-18 under the action of the falling U-shaped plate tension spring II-08, and the rolling friction between the cam and the bearing reduces energy consumption and improves economic efficiency; the shaft III II-09 is in interference fit with a shaft III positioning hole II-0104 on the shell pre-breaking box II-01.

The squeezing U-shaped plates II-04 and the falling U-shaped plates II-03 are cut from round iron pipes, and hinged together with the shell pre-breaking box through the shafts. The squeezing U-shaped plates II-04 and the falling U-shaped plates II-03 are each arranged vertically, and their horizontal cross sections are U-shaped. The squeezing U-shaped plates II-04 and the falling U-shaped plates II-03 are opposite to form vertical cylindrical structures. A plurality of trapezoidal grooves (not shown in the figures) are machined in the inner U-shaped squeezing surfaces of the squeezing U-shaped plates II-04 and the falling U-shaped plates II-03 to increase the friction with the surfaces of walnuts, there are gaps between the trapezoidal grooves, and the gaps are gradually reduced from top to bottom to position the walnuts of various sizes.

As shown in FIG. 18, the shaft I positioning holes II-0103, the shaft III positioning holes II-0104, the shaft IV positioning holes II-0106, and the shaft II positioning holes II-0105 completely penetrate the shell pre-breaking box II-01, the falling U-shaped plate box tension spring hanging rings II-0101 correspond to the middle positions of the nine stations of the shell pre-breaking box II-01 and are respectively fixed to the shell pre-breaking box II-01 by welding, and the squeezing U-shaped plate box tension spring hanging rings II-0102 correspond to the middle positions of the nine stations of the shell pre-breaking box II-01 and are respectively fixed to the shell pre-breaking box II-01 by welding.

Figure 21B:
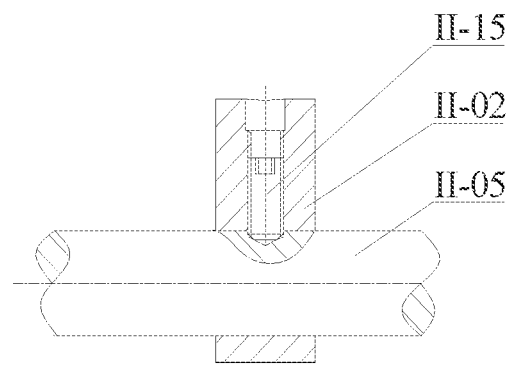
FIG. 21(b) is a cross-sectional view of a connecting part of the squeezing cam and a shaft I.
Figure 21C:
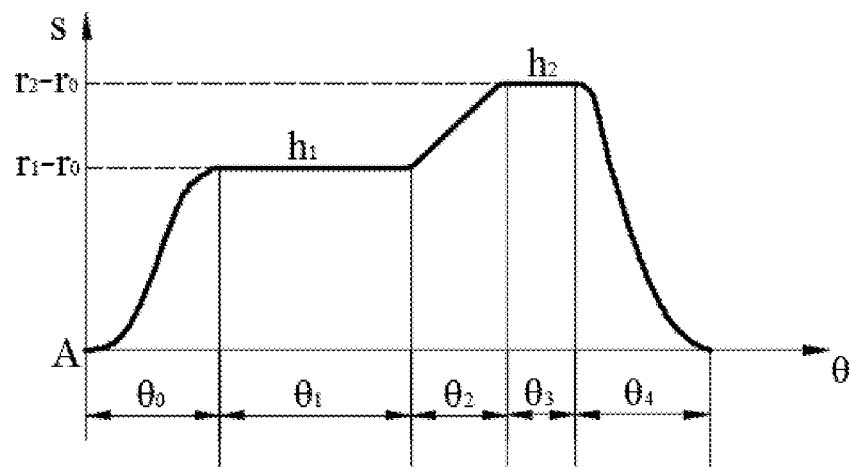
FIG. 21(c) is a schematic curve diagram of two lift strokes of the squeezing cam.
Figure 21D:
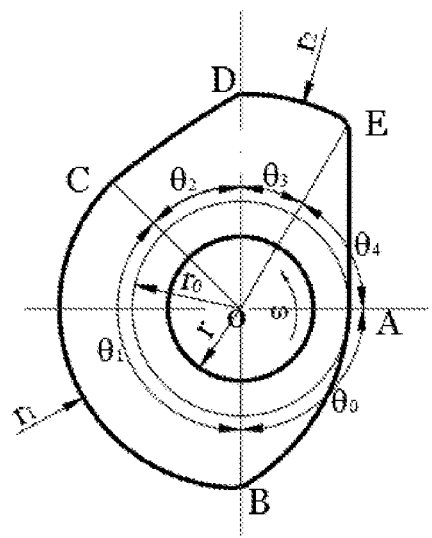
FIG. 21(d) is a schematic diagram of size design of the squeezing cam.
Figures 22, 22A:
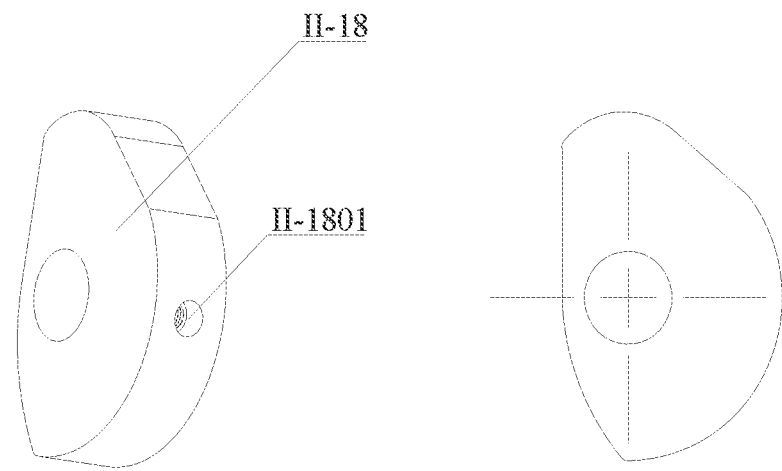
FIG. 22 is an axonometric view of a falling cam.
FIG. 22(a) is a side view of the falling cam.
Figure 22B:
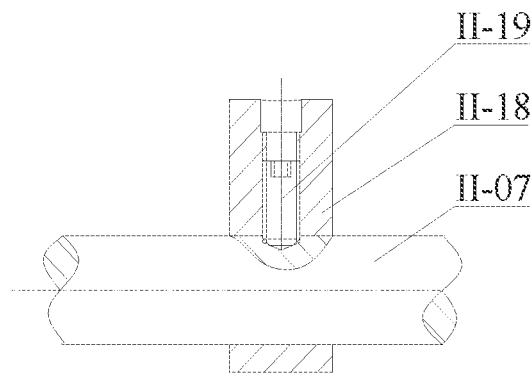
FIG. 22(b) is a cross-sectional view of a connecting part of the falling cam and a shaft II.
Figure 23:
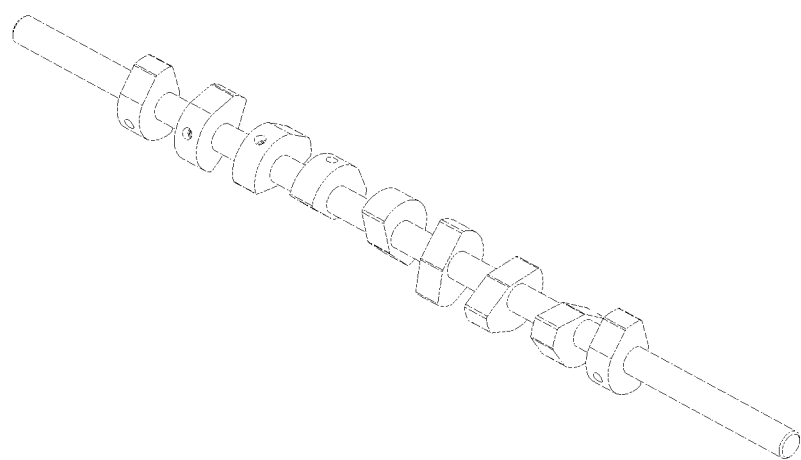
FIG. 23 is a schematic diagram of mounting positions of the squeezing cams.

As shown in FIG. 21, FIG. 21(*a*), FIG. 21(*b*), FIG. 21(*c*), and FIG. 21(*d*), the design of a squeezing cam will be described in detail below. According to the requirements and manufacturing cost of the shell pre-breaking device, in order to reduce the noise and violent vibration generated by the operation of the mechanism, cams of combining multiple motion laws are used to meet the operating requirements, that is, each squeezing cam is set to have two lift strokes, wherein the first lift stroke and return stroke have large displacement, and the corresponding rotation angles are also large, so a gentle quadratic polynomial motion law curve is used; the second lift stroke has small displacement, and the curve is too complicated to process, so a linear polynomial motion law curve is used.

Wherein, the equation of the quadratic polynomial motion law is:

$$S = C_0 + C_1\theta + C_2\theta^2 \quad (1)$$

$$V = \frac{ds}{dt} = C_1\omega + 2C_2\omega\theta$$

$$a = \frac{dv}{dt} = 2c_2\omega^2$$

In the equation, S is a displacement, $\theta$ is a rotation angle of the cam, $\omega$ is an angular velocity of the cam, a is an acceleration, and $C_0$, $C_1$, and $C_2$ are constants.

The equation of the linear polynomial motion law is:

$$S = C_0 + C_1\theta \quad (2)$$

$$V = \frac{ds}{dt} = C_1\omega$$

$$a = \frac{dv}{dt} = 0$$

In the equation, S is a displacement, $\theta$ is a rotation angle of the cam, $\omega$ is an angular velocity of the cam, a is an acceleration, and $C_0$ and $C_1$ are constants.

Considering the requirements of the body structure, the speed of the squeezing cam is $n_0$ r/min, and the diameter of the base circle is $d_0^{d_0}$. Considering the gaps between walnut shells and walnut kernels, the gaps between $m_{min}$~$m_{max}$ $m_{min}$ to $m_{max}$ are obtained by consulting data and self-statistics. Considering that walnut skin has certain elasticity, cracks are not necessarily grown under small deformation, so the total bilaterally symmetrical gap value of the maximum $m_{max}$ is $2m_{max}$. Because a maximum arm of force is obtained when the cam acts on a distal end of a clamping device, the diameters of walnuts are assumed to be $d_{min}$~$d_{max}$, that is, the horizontal displacements $a_i$ between the inner grooves of the squeezing U-shaped plates and the falling U-shaped plates under different lengths are $d_{min}$~$d_{max}$, the difference in displacement between two ends is approximately $\Delta d$ by calculation, i.e., $\Delta a_i$ is $\Delta d$, so in order to ensure that the walnuts falling to the middle and bottom can be fully squeezed to produce cracks, the lift stroke $h^{h_0}$ of the squeezing cam is determined to be $2m_{max}+\Delta d=h^{h_0}$.

Figures 26, 26A:
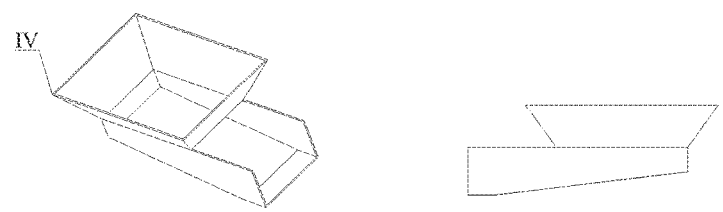
FIG. 26 is an axonometric view of a funnel device.
FIG. 26(a) is a side view of the funnel device.

As shown in FIGS. 26 and 26(a), the funnel device IV is composed of an upper funnel structure and a lower dustpan structure, the top of the funnel structure is connected to the shell pre-breaking box, the bottom of the funnel structure is communicated with the dustpan structure, and the walnuts after shell pre-breaking leak from the funnel device IV and are collected.

The specific operating process of this solution is as follows:

Walnuts are graded by reverse rotation between the single-helix twister I-19 and the double-helix twister I-18 in the feeding device I, the walnuts fall orderly by means of friction between the helical blades I-1903 and the short helical blades I-1803, that is, each time when each station of the shell pre-breaking device completes squeezing, the falling process corresponds to one walnut, so that small walnuts enter the plurality of stations on the left side of the shell pre-breaking device II after grading, and big walnuts fall orderly by means of friction between the helical blades I-1903 and the long helical blades I-1804 to enter the plurality of stations on the right side of the shell pre-breaking device II.

The specific implementation process of this solution will be described below, taking one station and one operating cycle of the shell pre-breaking device II as an example. The operating principle of other units is similar to this.

When a walnut fed by the feeding device begins to fall, the squeezing cam II-02 of the corresponding station is at the initial phase of the first lift stroke, the falling cam II-18 is at the outer dwell phase, and the squeezing U-shaped plate bearing II-24 and the falling U-shaped plate bearing II-20 are always in contact with the squeezing cam II-02 and the falling cam II-18 under the action of the squeezing U-shaped plate tension spring II-14 and the falling U-shaped plate tension spring II-08, so that the squeezing U-shaped plate II-04 and the falling U-shaped plate II-03 form a U-shaped caulking groove. Because the squeezing U-shaped plate II-04 and the falling U-shaped plate II-03 are hinged together with the shell pre-breaking II-01 through the shaft IV II-13 and the shaft III II-09, the squeezing U-shaped plate II-04 and the falling U-shaped plate II-03 rotate about the shaft IV II-13 and the shaft III II-09 as centers respectively, and the walnut is automatically positioned at an appropriate position in the caulking groove under the action of gravity. After the walnut is fixed in the caulking groove, the squeezing cam II-02 enters the lift stroke phase, and is in rolling contact with the squeezing U-shaped plate bearing II-24 to push the squeezing U-shaped plate II-04 to squeeze the walnut centered on the shaft IV II-13. Because the squeezing cam II-02 has two lift strokes, it squeezes the walnut twice. At this time, the falling cam II-18 is in the outer dwell state. The walnut will undergo unrecoverable plastic deformation after the elastic deformation phase. The walnut is squeezed to produce cracks, the falling cam II-18 enters the return phase, the falling U-shaped plate II-03 rotates about the shaft III II-09 as the center under the action of the falling U-shaped plate tension spring II-08, the lower opening is opened, the squeezed walnut falls under the action of gravity and rolls out through the funnel device IV, and the squeezing cam II-02 and the falling cam II-18 respectively return to the initial phase of the first lift stroke and the outer dwell phase after the falling is completed to process next batch of walnuts.

Although the specific embodiments of the present disclosure are described above in combination with the accompanying drawing, the protection scope of the present disclosure is not limited thereto. It should be understood by those skilled in the art that various modifications or variations could be made by those skilled in the art based on the technical solution of the present disclosure without any creative effort, and these modifications or variations shall fall into the protection scope of the present disclosure.

Described above are merely preferred embodiments of the present disclosure, and the present disclosure is not limited thereto. Various modifications and variations may be made to the present disclosure for those skilled in the art. Any modifications, equivalent substitutions, improvements and the like made within the spirit and principle of the present disclosure shall fall within the scope of the present disclosure.

The invention claimed is:

1. A multi-station adaptive walnut shell pre-breaking system, the system comprising:
    a feeding device and a shell pre-breaking device fixed to a frame, the feeding device is disposed above the shell pre-breaking device, and a funnel device is disposed below the shell pre-breaking device;
    the feeding device comprises a feeding box, a single-helix twister and a double-helix twister parallel to each other are disposed in the feeding box, the single-helix twister and the double-helix twister rotate in opposite directions, and an adjustable spring partition is disposed below the single-helix twister and the double-helix twister; and
    the shell pre-breaking device comprises a shell pre-breaking box, a plurality of squeezing stations are provided in the shell pre-breaking box, each of the squeezing stations is provided with a shell pre-breaking assembly, the shell pre-breaking assembly comprises a falling U-shaped plate and a squeezing U-shaped plate arranged oppositely, a first end of the falling U-shaped plate is hinged to the shell pre-breaking box, a second end of the falling U-shaped plate is pushed to move by a falling cam, the end of the squeezing U-shaped plate opposite to the first end of the falling U-shaped plate is pushed to move by a squeezing cam, the end of the squeezing U-shaped plate opposite to the second end of the falling U-shaped plate is hinged to the shell pre-breaking box, the squeezing cam is in an outer dwell state when the falling cam moves, and the falling cam is in an outer dwell state when the squeezing cam moves,
    wherein short helical blades and long helical blades are fixed on the outer side of a double-helix blade fixing shaft of the double-helix twister, the short helical blades and the long helical blades are arranged in parallel, the short helical blades are shorter than the long helical blades, and helical blades of the single-helix twister are tangent to the long helical blades of the double-helix twister.

2. The multi-station adaptive walnut shell pre-breaking system according to claim 1, wherein the single-helix twister and the double-helix twister are each arranged horizontally, a first baffle is fixedly disposed above the single-helix twister, a second baffle is fixedly disposed above the double-helix twister, the first baffle and the second baffle are arranged oppositely on side walls of the feeding box, the first baffle and the second baffle each tilt downward from the ends connected to the feeding box to the other ends, and a feeding inlet is formed between the first baffle and the second baffle.

3. The multi-station adaptive walnut shell pre-breaking system according to claim 1, wherein the adjustable spring partition comprises a U-shaped notched baffle arranged horizontally, one end of the U-shaped notched baffle is fixedly connected to the feeding box through two screw stem, the screw stem are sleeved with springs, the other end of the U-shaped notched baffle is provided with a plurality of U-shaped openings from which walnuts fall, and the U-shaped openings are correspondingly formed above the falling U-shaped plates and the squeezing U-shaped plates.

4. The multi-station adaptive walnut shell pre-breaking system according to claim 1, wherein the falling U-shaped plates and the squeezing U-shaped plates are each arranged vertically, the cross sections of the two are U-shaped, and the falling U-shaped plates and the squeezing U-shaped plates are opposite to form vertical cylindrical structures.

5. The multi-station adaptive walnut shell pre-breaking system according to claim 4, wherein the inner sides of the falling U-shaped plates and the squeezing U-shaped plates are provided with a plurality of trapezoidal grooves, there are gaps between the adjacent trapezoidal grooves, and the gaps are gradually reduced from top to bottom.

6. The multi-station adaptive walnut shell pre-breaking system according to claim 1, wherein a side of the falling U-shaped plate is connected to the shell pre-breaking box through a falling U-shaped plate tension spring, and a side of the squeezing U-shaped plate is connected to the shell pre-breaking box through a squeezing U-shaped plate tension spring.

7. The multi-station adaptive walnut shell pre-breaking system according to claim 1, wherein the falling cams of the plurality of squeezing stations are staggered by a set angle and fixed to the same rotating shaft; and the squeezing cams of the plurality of squeezing stations are staggered by a set angle and fixed to the same rotating shaft.

8. The multi-station adaptive walnut shell pre-breaking system according to claim 1, wherein the side of the falling U-shaped plate is hinged together with a falling U-shaped plate bearing by a pin, and the falling U-shaped plate bearing is in contact fit with the falling cam; the side of the squeezing U-shaped plate is hinged together with a squeezing U-shaped plate bearing by a pin, and the squeezing U-shaped plate bearing is in contact fit with the squeezing cam.

9. The multi-station adaptive walnut shell pre-breaking system according to claim 1, wherein the squeezing cam has two lift strokes, the contour of the squeezing cam corresponding to the first lift stroke is a quadratic polynomial curve, and the contour of the squeezing cam corresponding to the second lift stroke is a linear polynomial curve; and the squeezing cam and the falling cam are each connected to a power device by a driving mechanism.

* * * * *